US005966310A

United States Patent [19]
Maeda et al.

[11] Patent Number: 5,966,310
[45] Date of Patent: Oct. 12, 1999

[54] PERSONAL DESIGN SYSTEM AND PERSONAL EQUIPMENT PRODUCTION SYSTEM FOR ACTUALLY PRODUCING EQUIPMENT HAVING DESIGNED APPEARANCE

[75] Inventors: Tsuyoshi Maeda, Osaka; Seiichi Nishimura, Gunma; Hirotsugu Furutate, Hyogo; Kazuyoshi Tsukamoto, Hyogo; Takafumi Nakayama, Hyogo; Munenori Kishi; Yasuo Okuda, both of Osaka; Fumio Yasutomi, Hyogo, all of Japan

[73] Assignee: Sanyo Electric Co., Ltd., Osaka, Japan

[21] Appl. No.: 08/798,947

[22] Filed: Feb. 11, 1997

[30] Foreign Application Priority Data

| Feb. 13, 1996 | [JP] | Japan | 8-025117 |
| Nov. 28, 1996 | [JP] | Japan | 8-317915 |
| Nov. 29, 1996 | [JP] | Japan | 8-320239 |
| Nov. 29, 1996 | [JP] | Japan | 8-320240 |

[51] Int. Cl.$^6$ ................................................. G06F 17/50
[52] U.S. Cl. .............. 364/512; 364/468.03; 364/468.25; 345/334; 706/919
[58] Field of Search ..................... 364/512, 468.03, 364/468.25, 474.24; 395/118, 119, 333, 334, 919, 964, 120; 345/326, 333, 334, 420; 706/919

[56] References Cited

U.S. PATENT DOCUMENTS

| 5,581,672 | 12/1996 | Letcher, Jr. | 395/120 |
| 5,627,949 | 5/1997 | Letcher, Jr. | 395/120 |

OTHER PUBLICATIONS

Abstract of Japanese Patent Publ. No. 06103347A, dated Apr. 15, 1994.

By D. Jenkins et al., "Applying constraints to enforce user's intentions in free-hand 2-D sketches", IEEE, Intelligent Systems Engineering, Autumn 1992, pp. 31-49.

By A. Rhahmaoui et al., "Integration of Know-How in CAD/CAM Systems: A Way to Improve the Design Process", IEEE, Mar. 1993, pp. 547-552.

By L. Horvath et al., "Human Computer Interactions at Decision Making and Knowledge Acquisition in Computer Aided Process Planning Systems", IEEE, Apr. 1994, pp. 1415-1419, IEEE, Apr. 1994, pp. 1415-1419.

By L. Horvath et al., "Modeling Human-Computer Interactions in Collaborative Design and Planning", IEEE, Jan. 1995, pp. 1899-1903.

By J. Hanna et al., "Relational Computer-Aided Design", IEE, The Institution of Electrical Engineers, 1995, pp. 3/1-3/3.

By L. Horvath et al., "Attaching Knowledge to Product Model for Representation Human Intent", IEEE, Jan. 1997, pp. 1580-1585.

*Primary Examiner*—Kevin J. Teska
*Assistant Examiner*—Russell W. Frejd
*Attorney, Agent, or Firm*—Nikaido, Marmelstein, Murray & Oram LLP

[57] ABSTRACT

A personal design system according to the present invention designs the appearance of an equipment suiting the sensibility and the physical features of a user by establishing data communication between a user terminal comprising a user information inputting section and a server on the side of a producer. The user inputs user information such as the sensibility and the physical features of the user corresponding to the designed appearance of the equipment using the user information inputting section. The equipment having the designed appearance intended by the user is produced on the basis of the inputted user information and a database provided in the server by designing means provided in the user terminal.

21 Claims, 14 Drawing Sheets

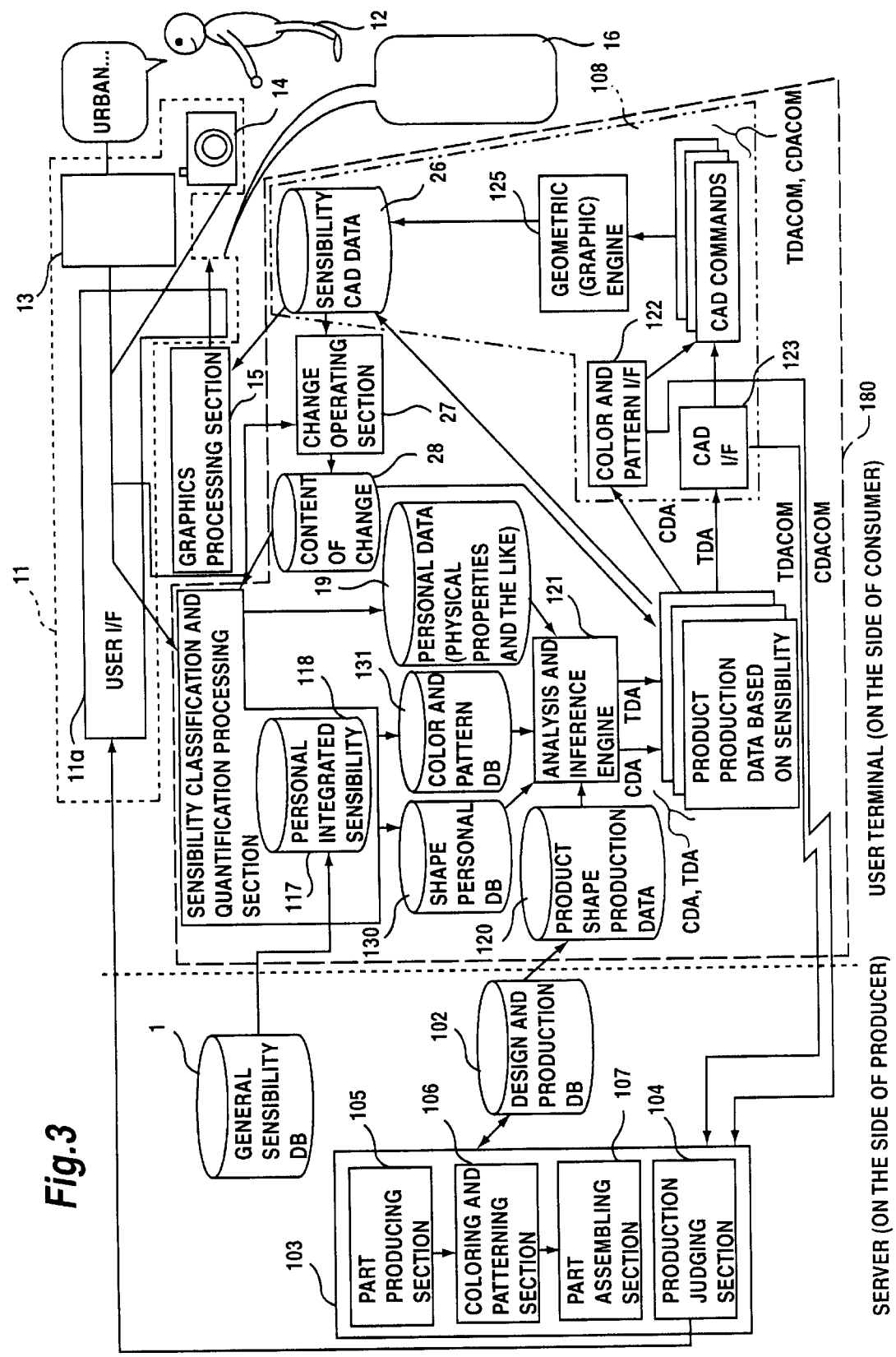

165
166a, 166b

166a 166a
167
166b

169

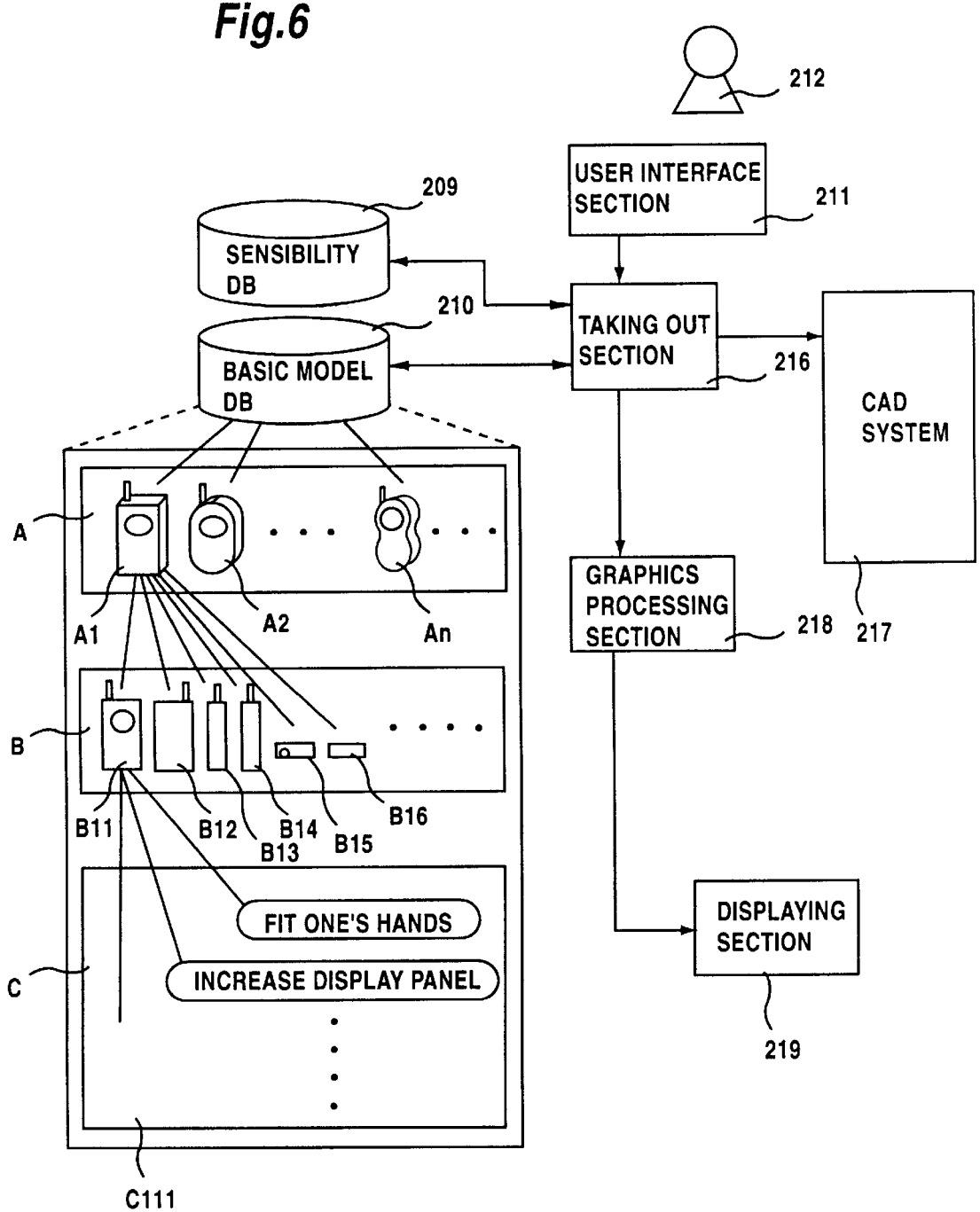

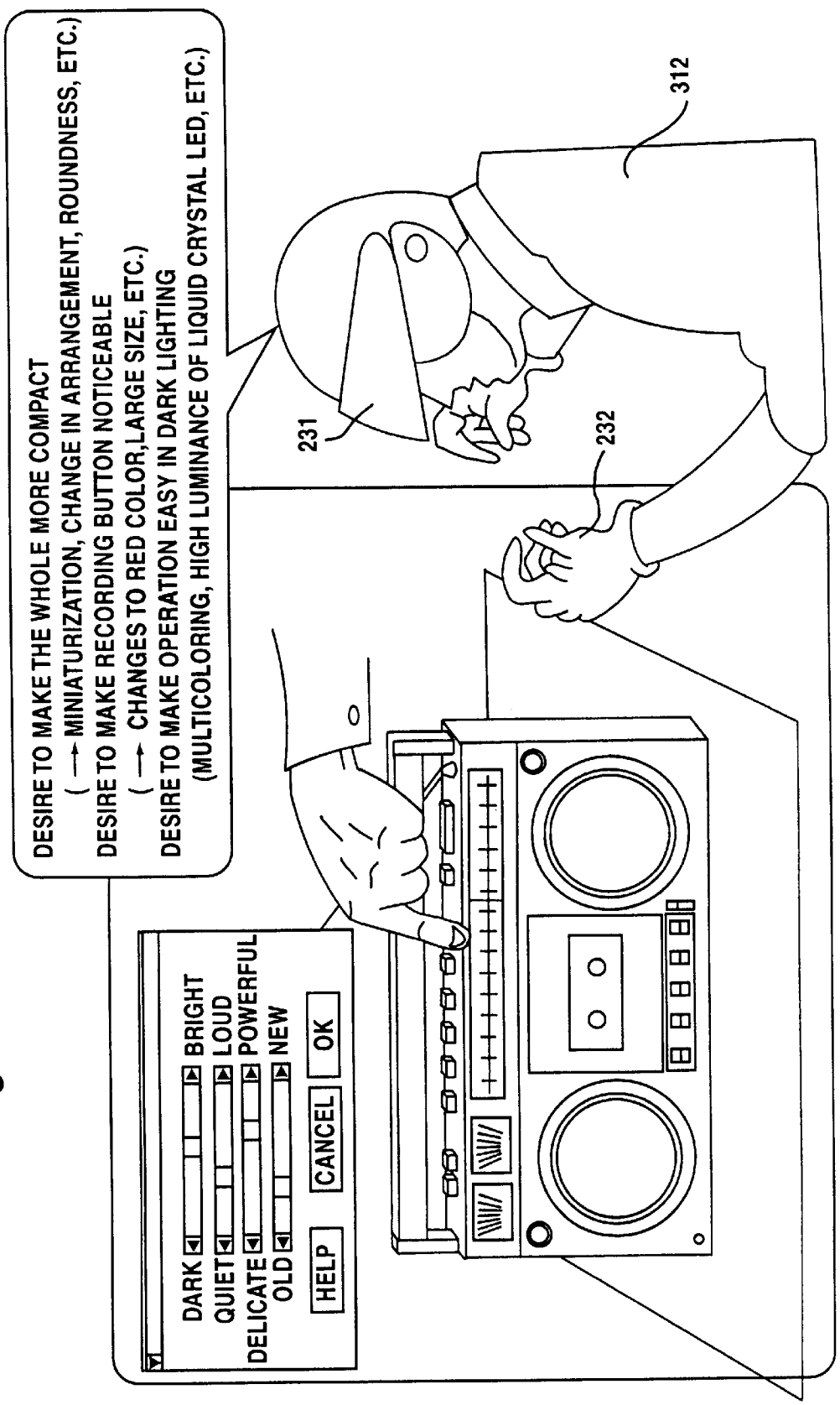

PERSONAL DESIGN SYSTEM AND PERSONAL EQUIPMENT PRODUCTION SYSTEM FOR ACTUALLY PRODUCING EQUIPMENT HAVING DESIGNED APPEARANCE

BACKGROUND OF THE INVENTION

1. Field of the Invention

The present invention relates generally to a CAD (Computer Aided Design) system, and more particularly, to a personal design system to which input can be simply provided for a general consumer and a personal equipment production system for actually producing an equipment having an appearance designed in the personal design system.

2. Description of the Prior Art

In recent years, as a CAD system, ones for an engineer having a certain degree of skill such as a two-dimensional CAD and a three-dimensional CAD have spread. However, the production of appearance of an equipment by a conventional CAD system requires complicated operations, whereby the CAD system is difficult for a general consumer which is not a specialist to handle.

In recent years, therefore, a device so adapted as to design the appearance of an equipment on the basis of an inputted word representing a user's intention (hereinafter referred to as a sensible word) has been proposed in the design of a front door, for example (see Japanese Patent Laid-Open No. 103347/1994).

However, the above-mentioned conventional equipment appearance design device is merely an equipment appearance design support device, and has the disadvantage in that it is difficult to construct a large-scale database required to cope with sensible words inputted by a variety of users.

Furthermore, the conventional equipment appearance design device only displays an image with respect to input of a sensible word representing a user's intention. Particularly when a user visually recognizes an equipment or the like displayed in a three-dimensional manner and desires to further input a sensible word, it is difficult for the user to suitably express an image intended by himself and herself with respect to the equipment displayed on a display screen in a three-dimensional manner. In addition, it takes long to change three-dimensional data on the basis of the inputted sensible word and display the equipment on the display screen in a three-dimensional manner, whereby it takes long to input the sensible word.

Furthermore, the above-mentioned equipment appearance design device cannot evaluate the ease of use in a certain use environment of an equipment having a designed appearance, for example, the interior and the exterior of a house, a living room and a bedroom even in the same house, and the morning and the night even in the same living room.

On the other hand, it is considered that an electronic/mechanical equipment spreading on the market is produced using the above-mentioned conventional CAD system by an engineer on the side of a producer (a corporation) manufacturing products. The electric/mechanical equipment is produced in accordance with a predetermined standard such as the taste or the physical features of a standard person. Consequently, an electronic/mechanical equipment (for example, a shape and a pattern) suiting the taste and the physical features of each user is hardly produced and sold. In recent years, with diversifying desires of users, the provision of an electronic/mechanical equipment reflecting a shape, a color and a pattern conforming to an image (sensibility) required by a user has been paid attention to.

In order to provide an electrical/mechanical equipment based on the design of an appearance conforming to an image (sensibility) required by a user, a system for producing the electronic/mechanical equipment on the basis of the design of the appearance intended by the user is required. That is, in order to satisfy the above-mentioned requirement, a system for performing a series of processing from the design of the appearance of the equipment conforming to the user's intention to the production of the electronic/mechanical equipment is required.

The present invention has been made in view of the above-mentioned prior art and has for its object to provide a personal design system which is very simple to handle and can design the appearance of an equipment suiting the sensibility and the physical features of a consumer by establishing data communication.

Another object of the present invention is to provide a personal equipment production system for producing an equipment on the basis of its appearance designed in conformity to a consumer's intention.

Still another object of the present invention is to provide a personal design system capable of shortening time to input an image (sensibility) intended by a user and capable of making it easy to extract a user's intention.

A further object of the present invention is to provide a personal equipment production system for estimating facility and the like of a designed equipment, corresponding to the environment in which the equipment is used.

SUMMARY OF THE INVENTION

A personal design system according to the present invention is characterized by comprising a server storing a sensibility database of a standard person statistically processed, a user terminal network-connected to the server, a user information inputting section provided in the user terminal for inputting user information such as sensibility from a user, a displaying section provided in the user terminal for displaying an image, designing means for designing the appearance of an equipment suiting the taste of the user on the basis of the user information sent from the user information inputting section, and graphics processing means for producing image display data representing the designed appearance of the equipment and outputting the image display data to the displaying section.

According to the above-mentioned construction, the user visually recognizes a sample model or the like of the equipment on the displaying section and inputs the user information such as sensibility in the user information inputting section so that the appearance of the equipment has a desired design. The designing means designs the appearance of the equipment suiting the taste of the user on the basis of the inputted user information while using data in the sensibility database, for example. Consequently, the user can design the appearance of the equipment suiting the taste by simple input. Further, the sensibility database can store large-scale and various data because it is stored in not the user terminal but the server. Therefore, the personal design system of the present invention can cope with user information inputted from a variety of users in the user terminal. Further, the load on a memory in the user terminal can be reduced, whereby storage efficiency and processing efficiency can be also improved. The designing means and the graphics processing means may be provided in either the server or the user terminal. When each of the designing means and the graphics processing means is composed of a plurality of constituent elements (for example, a sensibility classification and quantification processing section as described later), some of the constituent elements and the remaining constituent elements may be respectively provided in the server and the user terminal.

The user information may include sensibility data of the user and personal information data such as the physical features of the user. The appearance of the equipment of size conforming to the user's fingers can be designed by the designing means, for example, by including the sensibility data of the user and the personal information data such as the physical features of the user in the user information.

The designing means may comprise a sensibility classification and quantification processing section connected to the user information inputting section for classifying and quantifying the user information, and a personal information database storing personal information of the user obtained by the classification and quantification in the sensibility classification and quantification processing section.

According to the above-mentioned construction, the user information such as sensibility inputted in the user information inputting section is classified and quantified in the sensibility classification and quantification processing section, and the results of the classification and quantification are stored in the personal information database. When user information is inputted again from the user in the user information inputting section, therefore, the designing means can also reflect the user information previously inputted on the design of the appearance of the equipment.

The server may comprise a product shape production database storing the design of a basic model and a knowledge base storing production knowledge for producing the basic model. In this case, the designing means comprises an analysis and inference engine for producing design production data corresponding to the sensibility of the user on the basis of the sensibility database, the product shape production database, the knowledge base, and the personal information database. Consequently, the designing means can design the appearance of the equipment suiting the taste of the user better.

The designing means may comprise a CAD interface for converting the design production data to produce CAD data, and a CAD tool for producing sensibility CAD data based on the personal information of the user from the CAD data. In this case, the CAD interface and the CAD tool are provided in the server, and the produced sensibility CAD data is transmitted to the user terminal from the server.

Furthermore, the designing means may comprise a CAD interface for converting the design production data to produce CAD data, and a CAD tool for producing sensibility CAD data based on the personal information of the user from the CAD data. In this case, the CAD interface and the CAD tool are provided in the user terminal.

A personal equipment production system according to the present invention is characterized by comprising a server storing a sensibility database of a standard person statistically processed, a user terminal network-connected to the server, a user information inputting section provided in the user terminal for inputting user information such as sensibility from a user, a displaying section provided in the user terminal for displaying an image, designing means for designing the appearance of an equipment suiting the taste of the user on the basis of the user information sent from the user information inputting section, graphics processing means for producing image display data representing the designed appearance of the equipment and outputting the image display data to the displaying section, a design and production database provided in the sever and composed of design and production data required to design the appearance of the equipment and produce the equipment having the designed appearance, and producing means provided in the server for accepting the designed appearance of the equipment from the designing means and accepting the design and production data from the design and production database to produce the equipment having the designed appearance.

According to the above-mentioned construction, the user visually recognizes the design of a basic model to be the standard of the equipment on the displaying section in the user terminal, and inputs sensibility or the like representing a user's intention, for example, "fit one's hands" in the user information inputting section. The appearance of the equipment intended by the user is designed by the designing means using the inputted user information such as the sensibility, and the designed appearance of the equipment is given to the producing means. The producing means produces parts such as a casing of an electronic equipment relating to the design of the appearance of the electronic equipment on the basis of the designed appearance, and the equipment having the designed appearance is actually produced using the produced parts and previously prepared parts such as an electronic circuit board not relating to the designed appearance. Consequently, it is possible to realize a system capable of performing a series of processing from input of the user information such as the sensibility indicating a user's intention to the production of the equipment having the designed appearance conforming to the intention.

The user information may include sensibility data of the user and personal information data such as the physical features of the user.

The appearance of the equipment of size conforming to the user's fingers can be designed by the designing means, for example, by including the sensibility data of the user and the personal information data such as the physical features of the user in the user information.

The producing means may comprise a judging section for judging whether or not the equipment having the designed appearance sent from the designing means can be actually produced.

In a case that the appearance of the equipment in which the common part cannot be incorporated is designed when there exist a designed appearance of an equipment which has a problem in safety such as insufficient strength of the equipment and a common part which is not changed by the designed appearance, it is possible to judge that the equipment cannot be produced on the basis of the designed appearance intended by the user by providing the judging means. It is possible to report to the user that the equipment having the designed appearance intended by the user cannot be produced, for example, by using the result of the judgment.

Furthermore, the producing means may comprise a part producing section for producing parts of the equipment on the basis of the designed appearance of the equipment, a coloring and patterning section for coloring and patterning the parts produced in the part producing section on the basis of the designed appearance of the equipment, and a part assembling section for assembling the parts colored and patterned in the coloring and patterning section into the equipment on the basis of the design and production data.

In a personal design system so adapted as to design the appearance of an equipment in a three-dimensional manner on the basis of a word representing intention, the personal design system according to the present invention is characterized by comprising means for displaying a two-dimensional view relating to the equipment projected on a predetermined surface on an image displaying section and displaying a corrected two-dimensional view obtained by the correction based on the word representing intention on the image displaying section when the word is inputted.

According to the above-mentioned construction, the appearance of the equipment is designed on the basis of the word representing the intention (is corrected) with respect to the two-dimensional view, and the corrected appearance is represented by the two-dimensional view, whereby time required for data processing may be small, and the corrected appearance reflecting a presentation can be quickly presented to the user.

Furthermore, a method of not reflecting the user's intention while viewing the image of the equipment displayed in a three dimensional manner, that is, being conscious of a solid but merely expressing the intention with respect to a two-dimensional view, for example, a method of expressing a certain intention on a plan view of the equipment, expressing the other intention on a side view and expressing the other intention on a bottom view may, in some cases, more easily extract the user's intention. According to the above-mentioned construction, the extraction of the intention can be made easy.

The personal design system may further comprise a database previously storing data representing the two-dimensional view relating to the equipment projected on the predetermined surface. Specifically, respective data representing views such as a plan view, a side view, a front view, and a bottom view may be prepared with respect to the equipment. On the other hand, the data representing the two-dimensional view relating to the equipment projected on the predetermined surface may be produced on the basis of three-dimensional data of the equipment.

The personal design system may further comprise a database previously storing data representing the corrected two-dimensional view. For example, a plan view, a side view, a front view, a bottom view, and the like previously designed for each word, for example, "urban" or "fit one's hands" may be prepared. On the other hand, it may comprise correcting means for correcting the data representing the two-dimensional view on the basis of the word to produce the data representing the corrected two-dimensional view.

The personal design system further comprises judging means for judging whether or not the appearance of the equipment can be suitably designed in a three-dimensional manner from the data representing the corrected two-dimensional view with respect to each surface. The data representing the corrected two-dimensional view with respect to each surface may be previously stored in the database, or may be produced by automatically correcting, when the two-dimensional view is corrected with respect to a certain surface by the correcting means, the two-dimensional view with respect to the other surface, as described above. In a case where the two-dimensional view is automatically corrected with respect to the other surface, the side view and the other two-dimensional view are corrected for a word presented when the side view is being viewed, for example, after which the correction for a word presented when a plan view is being viewed may be correction contradictory to the correction in a case where the side view is being viewed, that is, the appearance of the equipment may not be designed in a three-dimensional manner. In such a case, therefore, the judging means judges that the appearance of the equipment cannot be designed in a three-dimensional manner. For example, the user is informed of the judgment. On the other hand, in a case where the data representing the corrected two-dimensional view with respect to each surface is previously stored in the database, when the two-dimensional view on the database is used as it is, it is considered that it is not judged that the appearance of the equipment cannot be designed in a three-dimensional manner. When the two-dimensional view is used upon being slightly corrected, it may be judged that the appearance of the equipment cannot be designed in a three-dimensional manner.

Various methods can be applied to a method of correcting three-dimensional data of an equipment based on the above-mentioned word. The method of correcting three-dimensional data of an equipment based on the word is not limited in the present invention. Examples of a method of correcting three-dimensional data include a method of stocking words representing a user's intention presented with respect to each of two-dimensional views such as a plan view, a side view and a front view, extracting a design parameter from a sensibility database on the basis of the stoked words after all the words are presented, and giving the design parameter to a three-dimensional CAD to design the appearance of an equipment in the CAD, and a method of designing the appearance of an equipment in a three-dimensional manner even in a three-dimensional CAD in parallel with correction of a two-dimensional view every time a word is inputted. Either of the methods may be used. Further, as a method of producing three-dimensional data reflecting a user's intention, it is also possible to subject a plan view to correction corresponding to the word as a plan view representing a predetermined surface, give coordinates for representing a solid to the corrected plan view, and handle a solid model obtained by extending the plan view in a direction of the coordinates as three-dimensional data reflecting the user's intention or three-dimensional data forming the basis thereof. In such a method of producing three-dimensional data, three-dimensional data is obtained by relatively simple data processing.

A personal design system according to the present invention is characterized by comprising a database holding a design parameter corresponding to a word representing intention, an equipment appearance designing section for designing the appearance of an equipment on the basis of the word representing intention, means for producing three-dimensional equipment display data of the equipment having the appearance designed in the appearance designing section on the basis of design data of the equipment, means for producing three-dimensional background display data corresponding to a use environment of the equipment, and means for synthesizing the three-dimensional equipment display data and the three-dimensional background display data and making a person image-recognize data obtained by the synthesis.

According to the above-mentioned construction, it is possible to evaluate the convenience of use of the equipment having the designed appearance under a certain environment, for example, the ease of seeing a display panel under a fluorescent lamp in a room or the matching of the interior of the room and the equipment by the above-mentioned image recognition. For the method of the image recognition, a method using virtual reality is suitable.

The personal design system may further comprise means for changing the three-dimensional background display data in response to a person's request. Consequently, it is possible to arbitrarily change the difference in the environment such as the interior and the exterior of a house, a living room and a bedroom even in the same house, and the morning and the night even in the same living room at the person's request and spuriously use and see an equipment having the appearance designed in the arbitrary environment.

The personal design system may further comprise means for accepting input of the word representing intention in a state where the person is made to image-recognize the data obtained by the synthesis, changing the designed appearance of the equipment on the basis of the inputted word representing intention, and changing the three-dimensional equipment display data with the change of the designed appearance. Consequently, it is possible to design the appearance of an equipment suiting the taste of the user better while making a user have a virtual-reality experience of the convenience of use of the equipment having the designed appearance, the matching of the interior of a room and the equipment, and the like.

The foregoing and other objects, features, aspects and advantages of the present invention will become more apparent from the following detailed description of the present invention when taken in conjunction with the accompanying views.

BRIEF DESCRIPTION OF THE DRAWINGS

FIG. 3 is a block diagram showing the schematic internal construction of a personal equipment production system according to a second embodiment of the present invention;

FIG. 6 is an image view showing the schematic construction of a personal design system according to a third embodiment of the present invention;

FIG. 15 is an explanatory view showing an image of evaluation of an appearance of an equipment designed by the personal design system according to the sixth embodiment of the present invention.

DESCRIPTION OF THE PREFERRED EMBODIMENTS

Embodiments of a personal design system and a personal equipment production system for actually producing an equipment having a designed appearance will be described in detail on the basis of drawings.

(First Embodiment)

Figure 1A:
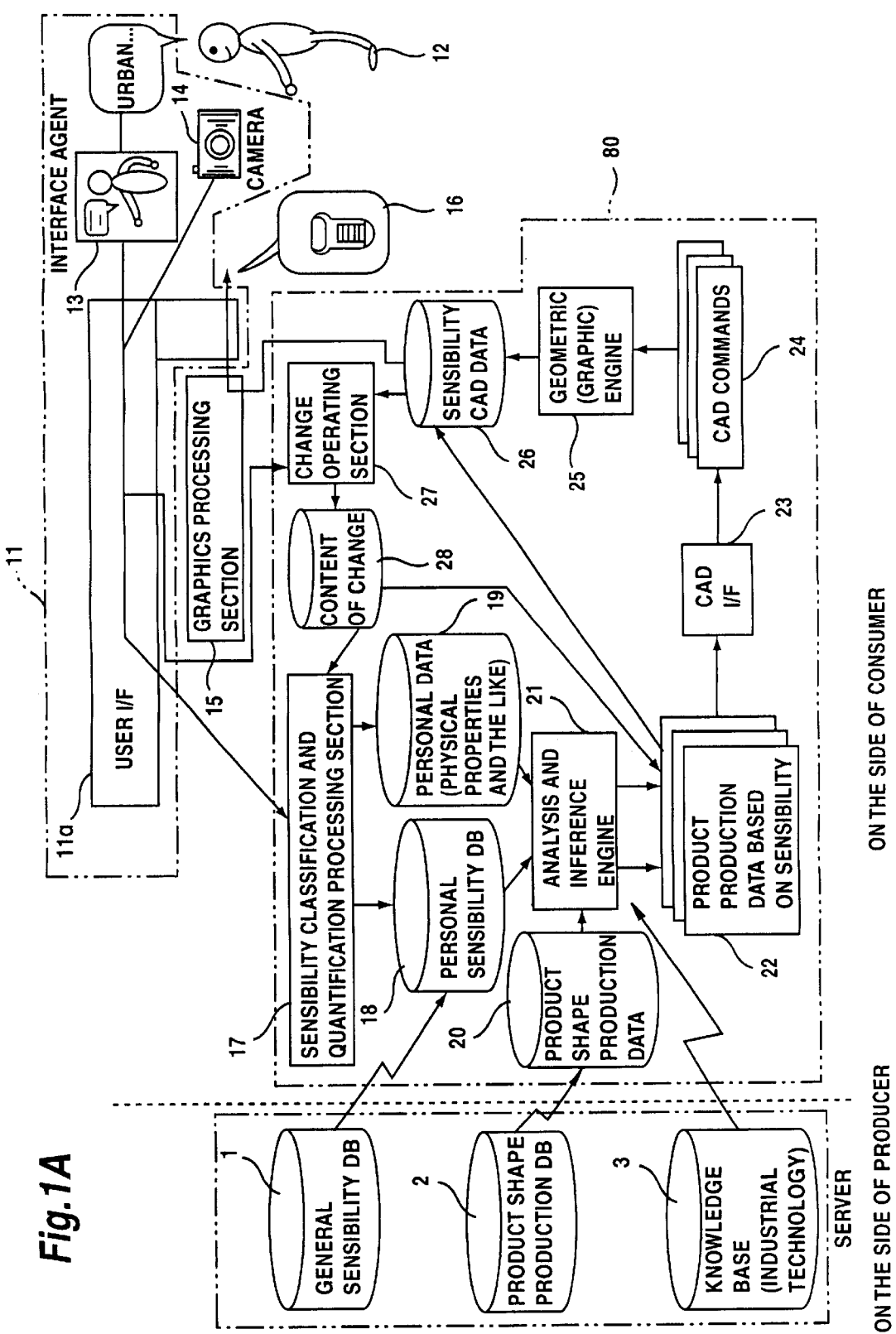
FIG. 1A is a block diagram showing the outline of a personal design system according to a first embodiment of the present invention.

FIG. 1A is a block diagram showing the outline of the construction of a personal design system according to a first embodiment of the present invention. In FIG. 1A, a server on the side of a producer first producing an equipment and providing the equipment comprises a general sensibility database 1 suiting the taste of a standard person, a product shape database 2 storing a basic model, and a knowledge base 3 storing production know-how such as industrial technology for producing an equipment suiting the taste of a user 12.

The general sensibility database 1 is one obtained by statistically processing data of a variety of persons, which corresponds to a correspondence between a sensible adjective for expressing feelings in a case where a person touches something with his or her hands and wears something, for example, and a predetermined physical parameter. Examples of data to be stored include a correspondence between a sensible adjective "warm" and a parameter "red", for example.

The product shape production database 2 stores design data of a basic model of an equipment which can be provided on the side of a producer. The design data is to be visually recognized by the user 12 on a displaying section in a user terminal as described later, and is used for changing the basic model to produce a model of an equipment intended by the user 12.

The knowledge base 3 is a database composed of data which forms the basis for judgment in terms of production as to whether or not a model of a suitable equipment can be actually produced on the basis of user information such as data representing sensibility and data representing physical properties which are obtained from the user 12.

Description is now made of a terminal on the side of the user 12 (it presupposes that a CAD tool is provided, for example). A user information inputting section 11 comprises a user interface section 11a, a tool (hereinafter referred to as an interface agent) 13 for accepting sensibility data such as sensibility from the user 12 which is a consumer, a camera 14 capable of accepting the shape of the fingers, for example, in the form of image data, and a key and a mouse used when the user 12 enters the sensibility data such as sensibility. The user information inputting section 11 outputs the accepted sensibility data, together with the data representing the physical features of the user 12 such as the above-mentioned image data, as user information to a sensibility classification and quantification processing section 17.

The interface agent 13 accepts the sensibility data by a system for making the user 12 answer yes or no to a question about sensibility (not shown) displayed on a monitor screen. Further, the interface agent 13 may accept the data representing the physical features by a system of making the user 12 answer yes or no to a question about the physical features or the like of the user 12 in place of the image data accepted by the camera 14.

The camera 14 is a device in which digital image data is obtained, for example, an electronic still camera.

The sensibility classification and qualification processing section 17 is connected to the user interface section 11a for classifying the user information accepted by the interface agent 13 and the camera 14 and quantitatively establishing a correspondence between the result of the classification and the sensibility data or personal data 19.

A personal sensibility database 18 stores data obtained by quantifying the sensibility data processed by the sensibility classification and quantification processing section 17 using the general sensibility database 1. The personal data 19 is data representing the physical properties or the like of the user 12. Product shape production data 20 is design data of a basic model of an equipment selected by the user 12 using the interface agent 13.

An analysis and inference engine 21 synthesizes information in the personal sensibility database 18 and the personal data 19 with the production data 20, analyzes the information, and infers what is desired by the user 12, to produce product production data 22.

The product production data 22 is data based on sensibility most suitable for the user 12 which is obtained by the analysis and inference engine 21, and is data in a format which has not been accepted as general CAD data yet.

A CAD interface 23 corrects the product production data 22 to commands 24 which can be used on a CAD upon format-conversion. The CAD commands 24 obtained by the conversion are replaced with sensibility CAD data 26 by a geometric (graphic) engine 25.

The sensibility CAD data 26 thus obtained is displayed on a monitor screen of a displaying section through a graphics processing section 15, for example. When an image is displayed on the monitor screen, it is desirable to perform processing in the graphics processing section 15, and really display the appearance of an equipment, for example, designed in conformity to an image of a basic model of the equipment which will be described later and sensibility by three-dimensional graphic display. In FIG. 1A, the outer shape of the equipment is displayed on a window 16 of the displaying section as an example of the display on the monitor screen.

Further, there is a case where a user desires to change a design produced once in response to the change in his or her taste. Therefore, a change operating section 27 produces the contents of the change on the basis of an operation of the interface agent 13 by the user, and holds the contents of the change in a storing section 28 composed of a memory and the like. The contents of the change are given to the sensibility classification and qualification processing section 17. The sensibility classification and qualification processing section 17 changes the data in the personal sensibility database 18 on the basis of the given contents of the change. It is also possible to directly change the product production data 22 by the contents of the change.

Figure 2A:
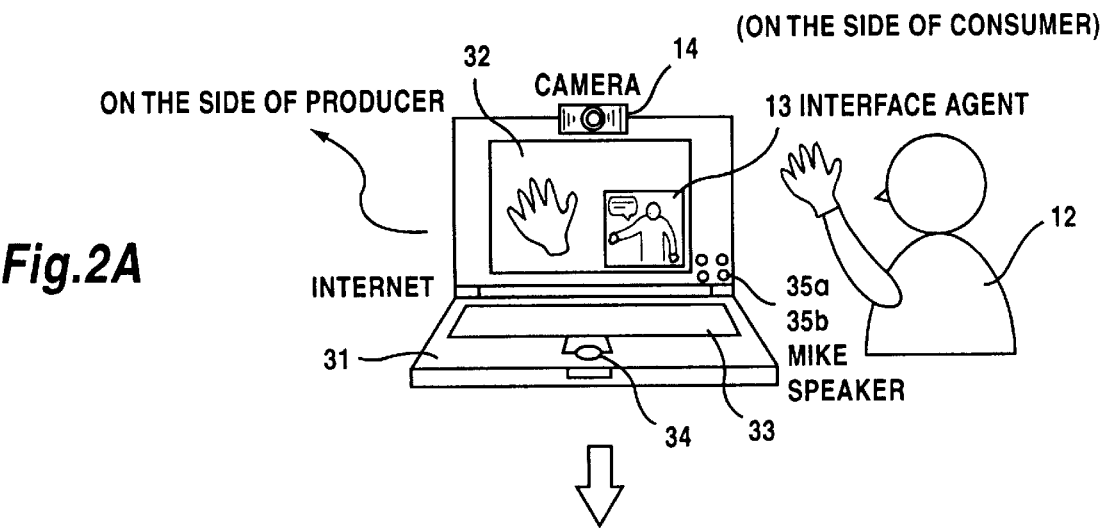
FIGS. 2A through 2C are typical views showing the details of a user interface in the present invention.

The interface agent 13 will be additionally described. As shown in FIG. 2A, the user 12 enters his or her information (for example, sensibility information) from a ten-key 33 or a mouse 34 in accordance with the contents of display of the interface agent 13 displayed on a monitor screen 32 of a terminal 31. Further, the camera 14 can also accept the operation and the facial expression of the user 12 as image data.

Figure 2B:
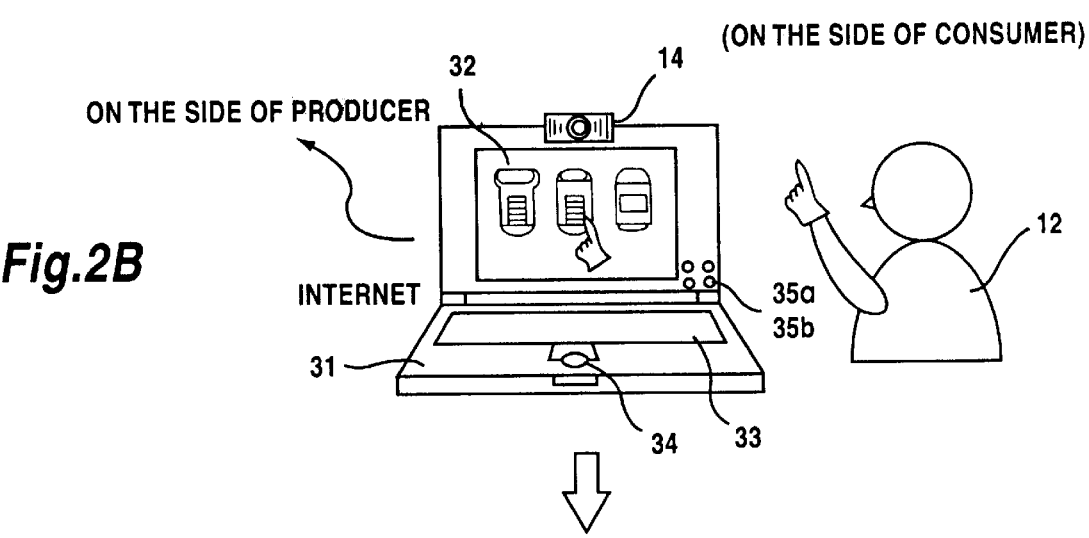

Furthermore, a basic model in the product shape production database 2 read from the server can be displayed on the monitor screen 32 of the displaying section and can be also selected by the user 12, as shown in FIG. 2B.

Figure 2C:
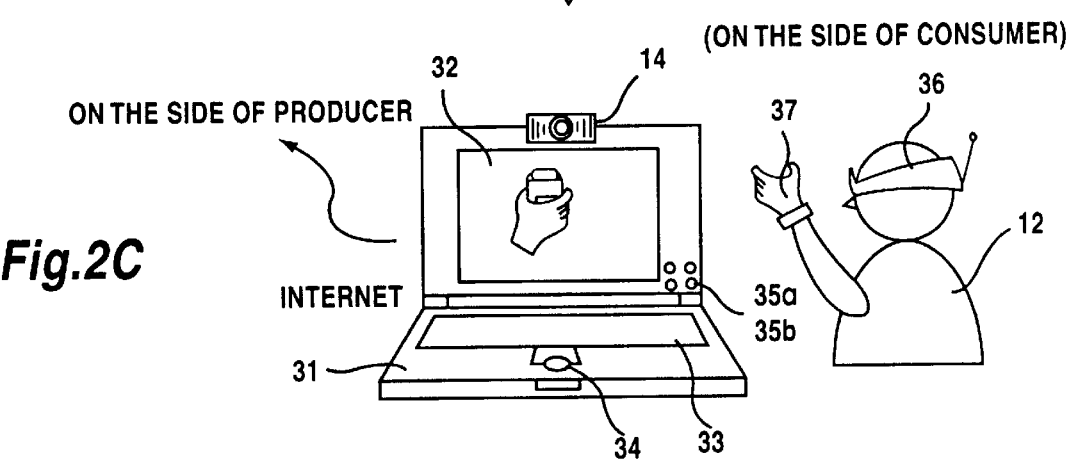
Figure 4A:
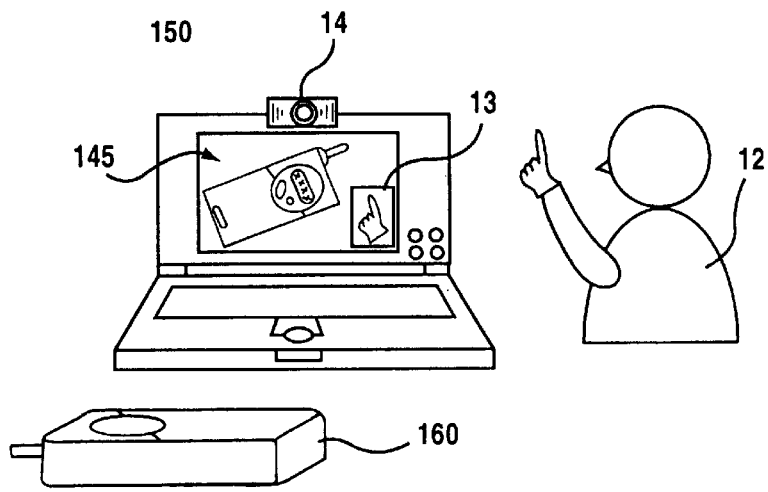
FIGS. 4A through 4D are typical views showing schematic processing of the personal equipment production system according to the second embodiment of the present invention.
Figure 4B:
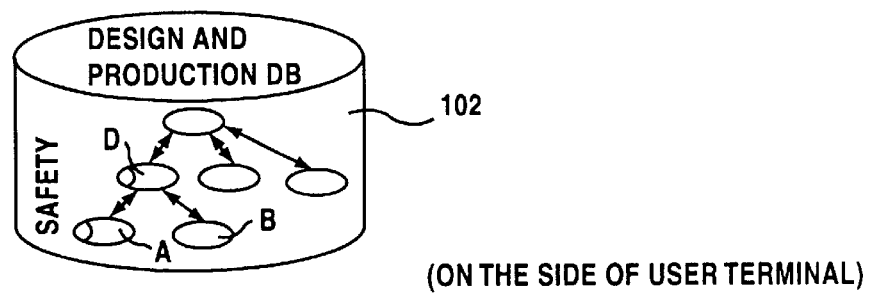
Figure 4C:
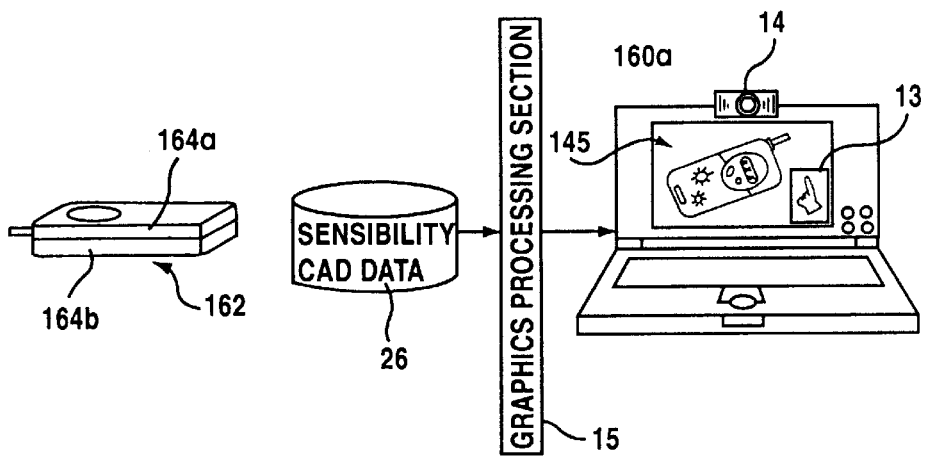
Figure 4D:
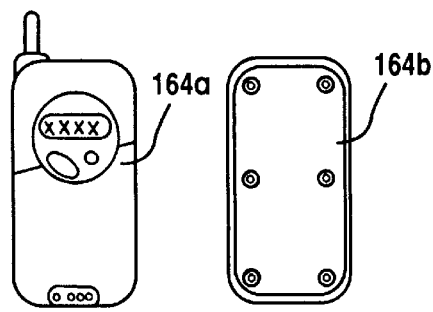

Additionally, the appearance of the equipment which can be designed in consideration of the sensibility of the user can be also VR (Virtual Reality)-displayed through the graphics processing section 15, as shown in FIG. 2C. The user information inputting section 11 is provided with a VR goggle 36 and a VR globe 37. The user 12 can have a virtual-reality (VR) experience using the goggle 36 and the globe 37.

The terminal is provided with a mike 35a or a speaker 35b. The speaker 35b is used for outputting a guidance message or the like in operating the interface agent 13. The mike 35a is used for voice input from the user 12, and is for serving the convenience of the user 12 which cannot handle a key or a mouse.

The function of a personal design system according to the first embodiment will be described on the basis of FIGS. 1A and 2 along the flow of data by taking as an example the time when the appearance of an electric razor is designed. At the time of the start, the sensibility database 1, the product shape production database 2 and the knowledge base 3 which are constructed in the server on the side of the producer are connected to the user terminal 31, and the interface agent 13 is displayed on the monitor screen 32 of the displaying section.

The user 12 selects an equipment having an appearance which he or she desires to design so as to suit his or her taste. That is, the user 12 selects a basic model of an equipment closest to his or her taste out of a plurality of basic models sent to the user terminal from the product shape production database 2 and image-displayed on the monitor screen 32, for example. Further, the user 12 enters sensibility data representing the user's intention upon visually recognizing the selected basic model of the equipment. A word representing the user's intention (hereinafter referred to as sensibility word), for example, "rounded" is inputted as sensibility data of the user 12. At this time, the camera 14 is simultaneously started, so that the shape of the face, the physical features, the shape of the fingers of the user 12 are accepted as image data.

When input information such as the sensibility data of the user 12 and the image data are thus obtained, the sensibility data and the image data are inputted as user information to the sensibility classification and quantification processing section 17 through the user interface section 11a.

The sensibility classification and quantification processing section 17 produces the personal sensibility database 18 and the personal data 19 by collating the user information with the general sensibility database 1. At this time, if personal sensibility information almost coincides with the contents of the general sensibility database 1, data extracted from the general sensibility database 1 becomes, of course, the personal sensibility database 18 as it is.

The personal sensibility database 18 and the personal data 19 which are produced are then handed to the analysis and inference engine 21, and are combined with the product shape production data 20 of the basic model selected by the user 12 and the production know-how stored in the knowledge base 3, to produce the product production data 22 based on the inputted sensibility.

The produced product production data 22 is not a format which cannot be understood by all CAD tools. That is, the product production data 22 is a format which cannot be handled by the CAD tools. Therefore, the product production data 22 is converted into the general purpose CAD commands 24 through the CAD interface 23. In this case, the product production data 22 becomes product design data which can be handled by various CAD tools.

The CAD commands 24 are further converted into CAD data through the geometric engine 25. At this time, the sensibility CAD data 26 representing the design of the appearance of the equipment conforming to the sensibility inputted by the user 12 is finally formed.

The formed sensibility CAD data 26 is displayed as a VR image on the monitor screen 32 through the graphics processing section 15. The user 12 can have a VR experience as if he or she saw a model of an electric razor designed by himself or herself with his or her eyes and touched it by the VR goggle 36 and the VR globe 37.

When it is desired to subject the designed model of the electric razor to correction by sensibility as a result of examination by the above-mentioned VR experience or the like, the user 12 can correct the input information such as the sensibility data again using the interface agent 13 or the like.

The change operating section 27 produces the contents of the change by the correction. The contents of the change is stored in the storing section 28 such as a memory, and is used for producing corrected sensibility CAD data 26 upon being handed to the sensibility classification and quantification processing section 17 and repeating the subsequent processing again. It goes without saying that the contents of the change are directly reflected on the product production data 22.

Figure 1B:
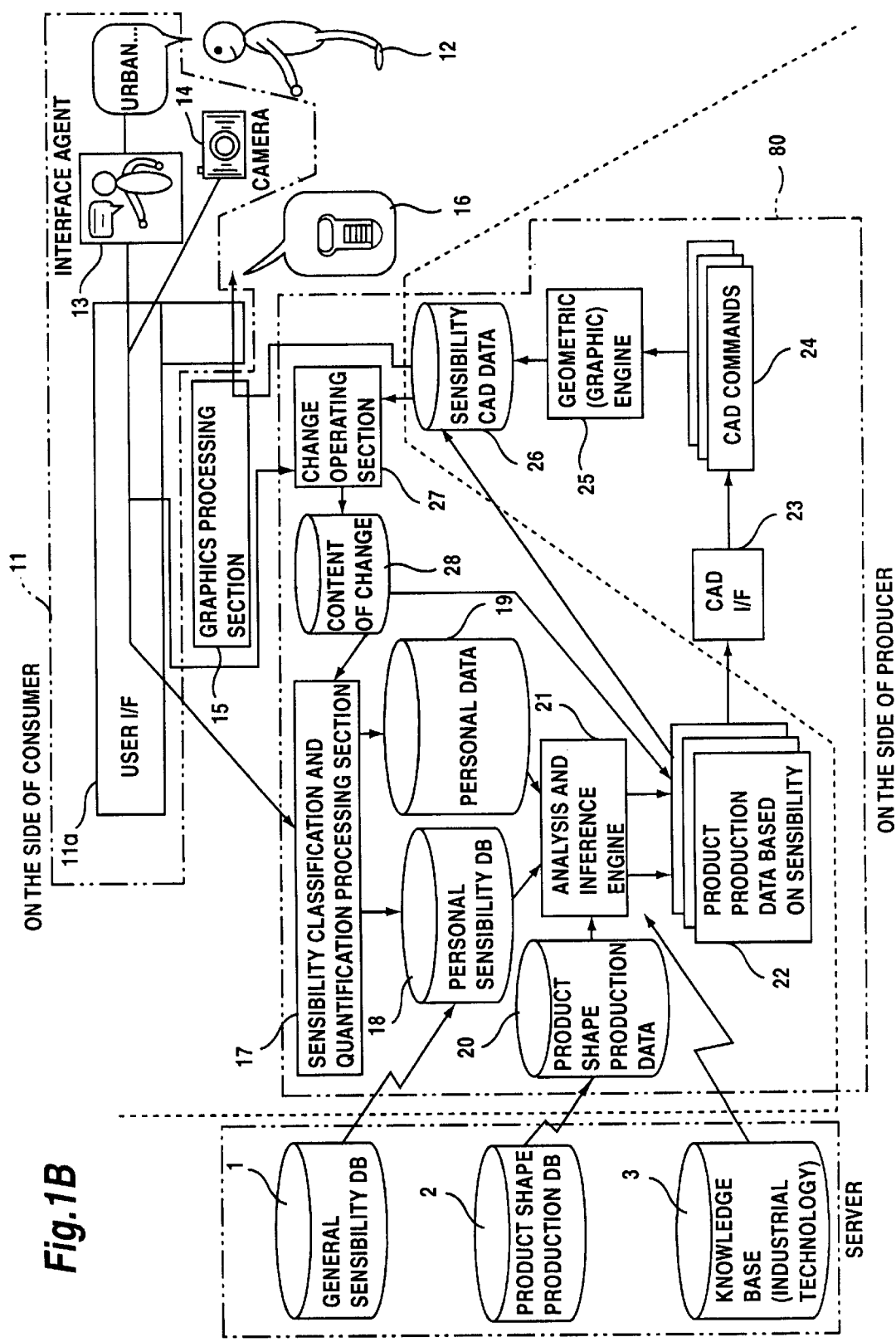
FIG. 1B is a block diagram showing another mode of the personal design system shown in FIG. 1A.

Designing means 80 in the present invention comprises the sensibility classification and quantification processing section 17, the personal sensibility database 18, the personal data 19, the analysis and inference engine 21, the CAD interface 23, a CAD tool such as the geometry engine 25, the change operating section 27, and the storing section 28. Although in the first embodiment as shown in FIG. 1A, all the constituent elements are constructed on the side of the user terminal, they may be constructed in the server on the side of the producer in order to reduce the load on the user terminal. The graphics processing section 15 may be provided in the server. Further, some of the constituent elements in the designing means 80 and the remaining constituent elements may be respectively provided in the server and the user terminal. For example, as shown in FIG. 1B, the CAD interface 23, the CAD commands 24, the geometry engine 25, and the sensibility CAD data 26 may be provided in the server on the side of the producer.

In the first embedment, the information such as the sensibility representing the user's intention is directly inputted at the user terminal as described above, so that it is possible to expect such an effect that data representing an equipment suiting the physical features and the taste of the user 12 himself or herself can be produced without specialized knowledge of the CAD utilizing each database in the server on the side of the producer, and it is possible for a consumer himself or herself to design the appearance of an equipment while staying at home.

(Second Embodiment)

FIG. 3 is a block diagram showing the schematic internal construction of a personal equipment production system according to a second embodiment of the present invention. The personal equipment production system is, for example, a system for actually producing an equipment in accordance with an appearance designed in the personal design system which is described in the first embodiment. Although description is made of a series of processing from the input of data to the production of an equipment in the present embodiment, therefore, the personal design system according to the first embodiment may be used for the production of product production data of an equipment having a designed appearance from the input of user information such as sensibility. The same constituent elements as those in the first embodiment are assigned the same reference numerals, and the description thereof is not repeated.

The personal equipment production system is constructed by connecting a server on the side of a producer producing an equipment (a product) and providing the produced equipment and a user terminal on the side of a user designing the appearance of the equipment through a network such as an internet.

Description is now made of the construction of the server on the side of the producer. The server comprises a sensibility database 1, a design and production database 102, and a product manufacturing section 103.

The design and production database 102 stores design data and design and production data. The design data represents the design of a basic model of an equipment which the producer can provide to the user. The design of the basic model of the equipment forms the basis for design conforming to the user's intention. The design and the production data represents part information of the equipment, the part arrangement of the equipment, the shape attribute of the equipment, and the like, and forms the basis for judgment as to whether or not an equipment having an appearance designed on the basis of sensibility data or the like obtained from a user 12 can be actually produced. The design and production database 102 may own judgment knowledge data used only when it is judged whether or not an equipment having an appearance designed on the side of the user 12 can be actually produced in addition to the design and production data.

The product manufacturing section 103 comprises a production judging section 104, a part producing section 105, a coloring and patterning section 106, and a part assembling section 107. The production judging section 104 judges whether or not the appearance of the equipment designed on the basis of two data transmitted from the user terminal, that is, command shape product production data (TDACOM) and command colored and patterned product production data (CDACOM) satisfies the production conditions set by design and production data in the design and production database 102. Specifically, with respect to a telephone set displayed on a monitor screen 116 of a displaying section shown in FIG. 3, safety indicating whether or not the strength thereof is sufficient is judged, and it is judged, when there is a common part (for example, an electronic circuit board) which is not changed by the design, whether or not the part such as the electronic circuit board can be incorporated into a casing of the telephone set formed in conformity to the design. The command shape product production data (TDACOM) and the command colored and patterned product production data (CDACOM) are produced on the basis of user information inputted from the user 12 on the side of the user terminal. When the production conditions are not satisfied, the production judging section 104 transmits to the user terminal an indication signal indicating that the production conditions are not satisfied. When the user terminal receives the indication signal, the user terminal reports to the user 12 that the equipment cannot be actually produced in accordance with the designed appearance intended by the user 12.

The product manufacturing section 105 is constituted by a device such as a three-dimensional plotter, and produces each of parts relating to the design of the appearance of the equipment on the basis of the command shape product production data (TDACOM) fed from the user terminal. Consequently, previously prepared parts are used as parts such as a circuit board not relating to the design of the appearance of the equipment. Each of the parts relating to the design of the appearance of the equipment is produced by irradiating light on the basis of three-dimensional data corresponding to the command shape product production data (TDACOM) onto a material composed of photo-curing resin using the three-dimensional plotter. The part may be produced by mounting an adjuster or the like on the existing metal mold.

The coloring and patterning section 106 paints and patterns each of the parts relating to the design of the appearance of the equipment which are produced by the part producing section 105 on the basis of the command colored and patterned product production data (CDACOM) fed from the user terminal.

The part assembling section 107 assembles the parts relating to the design of the appearance of the equipment which are patterned, for example, by the coloring and patterning section 106 and the other parts not relating to the design of the appearance of the equipment on the basis of the above-mentioned design and production data.

Description is now made of the construction of the user terminal on the side of the user. The user terminal is realized by using a personal computer or the like. The user terminal comprises a user information inputting section 11. The user information inputting section 11 outputs sensibility data representing intention accepted in a tool (hereinafter referred to as an interface agent) 13 and data representing physical features such as image data accepted in a camera 14 as user information to a sensibility classification and quantification processing section 117.

The sensibility classification and quantification processing section 117 comprises a personal integrated sensibility database 118 of the user 12 which is previously constructed. The personal integrated sensibility database 118 may be produced or updated upon input of the user information. The personal integrated sensibility database 118 is produced using data relating to the sensibility of the user 12 (the user's intention) and data in the general sensibility database 1 stored in the server.

The sensibility classification and quantification processing section 117 classifies and quantifies sensibility data representing the inputted user information by collating the inputted user information with the personal integrated sensibility database 118, to produce a shape personal sensibility database 130 and a color and pattern personal sensibility database 131. The sensibility classification and quantification processing section 117 may produce the shape personal sensibility database 130 and the color and pattern personal sensibility database 131 by collating the inputted sensibility data with the personal integrated sensibility database 118. Further, the sensibility classification and quantification processing section 117 produces personal data 19 on the basis of data such as the image data representing the user information. The shape personal sensibility database 130 represents the sensibility of the user 12 (the user's intention) relating to a shape, and the color and pattern personal sensibility database 131 represents the sensibility of the user 12 (the user's intention) relating to a color and a pattern.

An analysis and inference engine 121 synthesizes product shape production data 120 which is the design data representing the basic model of the equipment which is transmitted from the design and production database 102 and is selected by the user 12 in the user information inputting section 11, the shape personal sensibility database 130, the color and pattern personal sensibility database 131, and the personal data 19, analyzes the data, and infers the design of the appearance of the equipment desired by the user 12. The analysis and inference engine 121 produces shape product production data (TDA) and colored and patterned product production data (CDA) which represent the design of the appearance of the equipment designed by the user 12 on the basis of the sensibility of the user 12 (the user's intention) by the above-mentioned analysis and inference.

A CAD data converting section 108 comprises a CAD interface section 123, a coloring and patterning interface section 122, and a geometry engine 125. The shape product production data (TDA) and the colored and patterned product production data (CDA) which are produced by the analysis and inference engine 121 are not formats (in the form of data) which can be applied to a CAD tool (not shown) provided in the user terminal. The CAD interface section 123 converts the shape product production data (TDA) into commands to which the CAD tool can be applied, to produce command shape product design data (TDACOM). The coloring and patterning interface section 122 similarly converts the colored and patterned product production data (CDA) into commands, to produce command colored and patterned product design data (CDACOM). The geometry engine 125 accepts the command shape product design data (TDACOM) and the command colored and patterned product design data (CDACOM) which are produced, and changes the command shape product design data (TDACOM) and the command colored and patterned product design data (CDACOM) into CAD data, to produce sensibility CAD data 26.

Description is now made of processing from the input of an image by the sensibility of the user 12 (the user's intention) to the production of an equipment on the basis of the above-mentioned construction. FIGS. 4 and 5 are typical views showing the schematic processing on the side of the server.

The design data representing the basic model of the equipment which is transmitted to the user terminal from the design and production database 102 in the sever is subjected to data processing in a graphics processing section 15 in the user terminal, and is displayed on a display screen 145 of a displaying section in the user terminal. That is, the basic model of the equipment is displayed on the display screen 145 of the displaying section in the user terminal. Further, the interface agent 13 is so displayed on the display screen that the sensibility data can be inputted from the user 12. The user 12 selects a basic model 150 of an equipment suiting his or her taste out of basic models of a plurality of equipments displayed. The interface agent 13 is used, so that sensibility data representing the user's intention is inputted from the user 12 visually recognizing the selected basic model. At this time, image data representing the shape of the fingers, for example, of the user 12 is accepted from the camera 14 located above the user terminal (see FIG. 4A). The user information inputting section 11 outputs to the sensibility classification and quantification processing section 117 using as user information the accepted data such as the sensibility data and the image data.

The sensibility classification and qualification processing section 117 classifies and quantifies the sensibility data representing the given user information by collating the user information with the personal integrated sensibility database 118, to produce the shape personal sensibility database 130 and the color and pattern personal sensibility database 131. Further, the sensibility classification and quantification processing section 117 produces the personal data 19 on the basis of the data such as the image data representing the user information. The shape personal sensibility database 130, the color and pattern personal sensibility database 131 and the personal data 19 which are produced are outputted to the analysis and inference engine 121.

The analysis and inference engine 121 produces, when the shape personal sensibility database 130, the color and pattern personal sensibility database 131 and the personal data 19 are fed thereto, the shape product production data (TDA) by the shape personal sensibility database 130, the personal data 19, and the product shape production data 120 representing the selected basic model of the equipment, and produces the colored and patterned product production data (CDA) by the color and pattern personal sensibility database 131, the personal data 19, and the product shape production data 120 representing the selected basic model of the equipment.

The produced shape product production data (TDA) is fed to the CAD interface section 123 in the CAD data converting section 108, and is converted into the command shape product production data (TDACOM) in the CAD interface section 123. The command shape product production data (TDACOM) obtained by the conversion is transmitted to the product manufacturing section 103 in the server through the network. The colored and patterned product production data (CDA) is fed to the coloring and patterning interface section 122 in the CAD data converting section 108, and is converted into the command colored and patterned product production data (CDACOM) in the coloring and patterning interface section 122. The command colored and patterned product production data is transmitted to the product manufacturing section 103 in the server through the network.

The production judging section 104 in the product manufacturing section 103 in the server produces a virtual equipment 160 on the basis of the command shape product production data (TDACOM) upon receipt of the command shape product production data (TDACOM) and the command colored and patterned product production data (CDACOM). The production judging section 104 judges whether or the virtual equipment 160 can be actually produced on the basis of the design and production data in the design and production database 102 (see FIG. 4B).

The production judging section 104 transmits, when it judges that the virtual equipment 160 cannot be actually produced, a signal indicating that production is impossible to the user information inputting section 11 in the user terminal. It is indicated that the virtual equipment 160 cannot be produced in accordance with the design data displayed on the display screen 145 of the displaying section in the user terminal shown in FIG. 4A. On the other hand, when it is judged that the virtual equipment 160 can be actually produced, the product manufacturing section 103 produces the equipment on the basis of the command shape product production data (TDACOM) and the command colored and patterned product production data (CDACOM). In this case, the sensibility CAD data 26 produced upon processing the command shape product production data (TDACOM) and the command colored and patterned product production data (CDACOM) in the CAD data converting section 108 on the side of the user terminal is fed to the graphics processing section 15. The graphics processing section 15 subjects the sensibility CAD data 26 to data processing, and displays an equipment 160a obtained by coloring and patterning the virtual equipment 160 on the display screen 145 of the displaying section in the user terminal (see FIG. 4C).

The part producing section 105 in the product manufacturing section 103 produces three-dimensional part data 162 representing the shape of the virtual equipment 160 on the basis of the fed design and production data in the design and production database 102 and the fed command shape product production data (TDACOM). For example, the shape of an equipment shall be determined by the shapes of a front surface package and a rear surface package. In this case, the part data 162 comprises data 164a representing the shape of a front surface package part and data 164a representing the shape of a rear surface package part (see FIG. 4C).

Figure 5A:
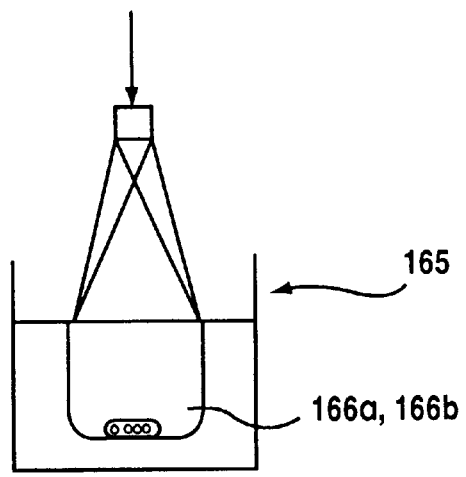
FIGS. 5A through 5D are typical views showing schematic processing of the personal equipment production system according to the second embodiment of the present invention.
Figure 5B:
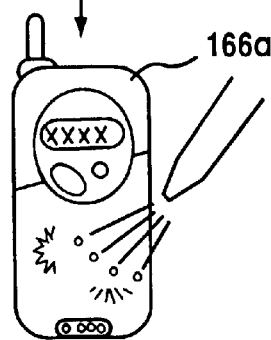
Figure 5C:
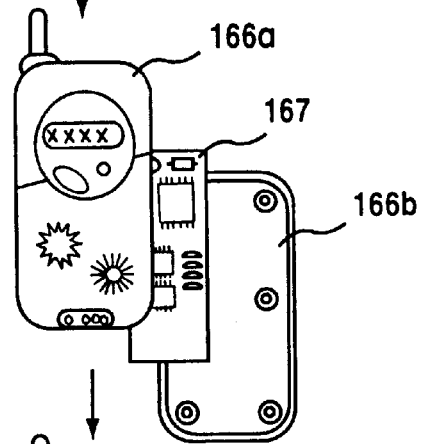
Figure 5D:
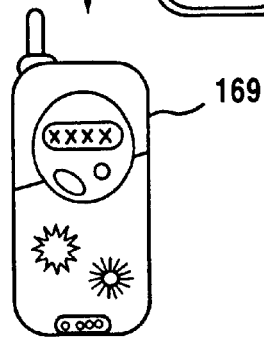

The part producing section 105 in the product manufacturing section 103 divides the part data 162 into the data 164a representing the shape of a front surface package part and the data 164b representing the shape of a rear surface package part (see FIG. 4D), and produces a front surface package part 166a and a rear surface package part 166b of the actual equipment by a three-dimensional plotter 165 for each data obtained by the division (see FIG. 5A).

The coloring and patterning section 106 subjects the produced front surface package part 166a to surface grinding, and then paints and patterns the front surface package part 166a on the basis of the command colored and patterned product production data (CDACOM). The rear surface package part 166b is also subjected to surface grinding, and is painted and patterned, which is not illustrated. The part assembling section 107 assemblies the front surface package part 166a and the rear surface package part 166b which are painted and patterned and the other part 167 on the basis of the design and production data (see FIG. 5C), to complete an actual equipment 169 (see FIG. 5D).

As described in the foregoing, when the design of the appearance of the equipment is determined by the user's intention in the user terminal, it is transmitted to the server through the network, so that it is judged whether or not the equipment can be actually produced on the basis of the determined design. When it is judged that the equipment can be produced, the equipment is produced on the basis of the determined design of the appearance of the equipment. Consequently, the equipment is produced on the basis of the design determined by the user's intention, whereby the user can easily obtain the intended equipment (design).

Although in the second embodiment, the command shape product production data (TDACOM) and the command colored and patterned product production data (CDACOM) are separately transferred to the server on the side of the producer from the user terminal, the two data may be transmitted as one data.

Designing means 180 in the present invention comprises the sensibility classification and quantification processing section 117, the personal integrated sensibility database 118, the personal data 19, the shape personal sensibility database 130, the color and pattern personal sensibility database 131, the product shape production data, the analysis and inference engine 121, the CAD data converting section 108, a change operating section 27, and a storing section 28. Although in the second embodiment as shown in FIG. 3, all the constituent elements are constructed on the side of the user terminal, they may be constructed in the server on the side of the producer in order to reduce the load on the user terminal. Further, they may be constructed on either side.

According to the above-mentioned personal equipment production system, it is possible to realize a system performing processing from the design of the appearance of the equipment conforming to the user's intention to the production of the equipment based on the designed appearance, whereby the user can easily obtain the intended equipment.
(Third Embodiment)

FIG. 6 is an image view showing the schematic construction of a personal design system according to a third embodiment of the present invention. The personal design system comprises a general sensibility database 209, a basic model database 210, a user interface section 211, a taking-out section 216, a CAD system 217, a graphics processing section 218, and a displaying section 219.

The general sensibility database 209 is one obtained by statistically processing data of a variety of persons, for example, one which is a correspondence between a sensible adjective expressing feelings in a case where a person touches something with his or her hands and wears something and a predetermined physical parameter. Examples of data to be stored include data which is a correspondence between a sensible adjective "warm" and a physical parameter "red", for example.

The basic model database 210 comprises a group of basic model data A, a group of basic model data representing six surface views B, and a group of deformed data representing six surface views C. The group of basic model data A is composed of basic model data A1 to An. The basic model data A1 to An represent basic models of equipments which can be provided to a user 212. That is, the basic model data A1 to An form the basis for design of the appearance of an equipment in accordance with the user's invention.

The group of basic model data representing six surface views B is composed of data representing six surface views such as a front view and a side view of the basic model. Data representing a front view B11, data representing a rear view B12, data representing a right side view B13, data representing a left side view B14, data representing an upper view B15, and data representing a bottom view B16 are constructed with respect to the basic model data A1. Data representing six surface views are constructed with respect to the other basic model data A2 to An, similarly to the basic model data A1.

The group of deformed data representing six surface views C is composed of deformed data representing six surface views obtained by deforming the data representing six surface views. The deformed data representing six surface views are obtained by the word deformation based on a word representing the user's intention (hereinafter referred to as a sensible word). That is, the data representing six surface views represent six surface views such as a side view, a front view, and a bottom view previously designed for each sensible word such as a sensible word "fit one's hands" or a sensible word "increase a display panel". For example, deformed data representing a front view C111 is data obtained by changing the data representing a front view B11 in correspondence to the sensible word "fit one's hands". The others of the deformed data representing six surface views are similarly constructed.

The user interface section 211 accepts entry by the user 212 in inputting means such as a key and a mouse, and outputs to the taking-out section 216 a basic model selection signal for taking out basic model data corresponding to the design of the basic model designated by the user 212. The user interface section 211 outputs to the taking-out section 16 a six surface view selection signal for taking out data, which corresponds to a view designated by the user 212 out of six surface views (a front view, a side view, a rear view, and the like), out of the data representing six surface views. Further, the user interface section 211 outputs to the taking-out section 216 a sensible word representing the user's intention.

The basic model selection signal, the six surface view selection signal and the sensible word are fed to the taking-out section 216 from the user interface section 211. The taking-out section 216 takes out, when the basic model selection signal is fed thereto, basic model data designated by the basic model section signal from the basic model database 210, and outputs the basic model data to the CAD system 217. The taking-out section 216 takes out, when the six surface view selection signal is fed thereto, data representing six surface views designated by the six surface view selection signal from the basic model database 210, and outputs the data representing six surface views to the graphics processing section 218. Further, the taking-out section 216 takes out a predetermined physical parameter designated by the sensible word, and outputs the physical parameter to the CAD system 217 and the graphics processing section 218. Specifically, the basic model selection signal, the six surface view selection signal and the sensible word from the user interface section 211 are fed to the taking-out section 216, so that the deformed data representing six surface views indicating two-dimensional data and the predetermined physical parameter which are designated by the sensible word are taken out, and are fed to the graphics processing section 218. Further, three-dimensional basic model data and the predetermined physical parameter are inputted to the CAD system 217. The deformed data representing six surface views indicating two-dimensional data designated by the sensible word may be outputted to the CAD system 217.

The CAD system 217 is realized by a three-dimensional CAD system or the like, and designs the appearance of a three-dimensional equipment intended by the user 212 when the three-dimensional basic model data and the predetermined physical parameter are fed thereto. Further, the user 212 may accept the deformed data representing six surfaces and design the appearance of the three-dimensional equipment. For example, a solid model obtained by accepting the deformed data representing a front view C111 out of the deformed data representing six surface views and extending the deformed front view toward the rear surface may be taken as the appearance of the three-dimensional equipment reflecting the user's intention.

The graphics processing section 218 performs data processing so that the data representing six surface views or the deformed data representing six surface views and the physical parameter which are fed from the taking-out section 216 can be graphically displayed in a two-dimensional manner on the displaying section 219. The graphics processing section 218 may perform data processing, when the user respectively inputs sensibility to a plurality of planes (for example, three planes), so that the three planes can be visually recognized in a three-dimensional manner. The graphics processing section 218 may process data so that three-dimensional basic model data is displayed in a three-dimensional manner on the display screen.

The displaying section 219 displays data on the basis of the data fed from the graphics processing section 218.

Figure 7:
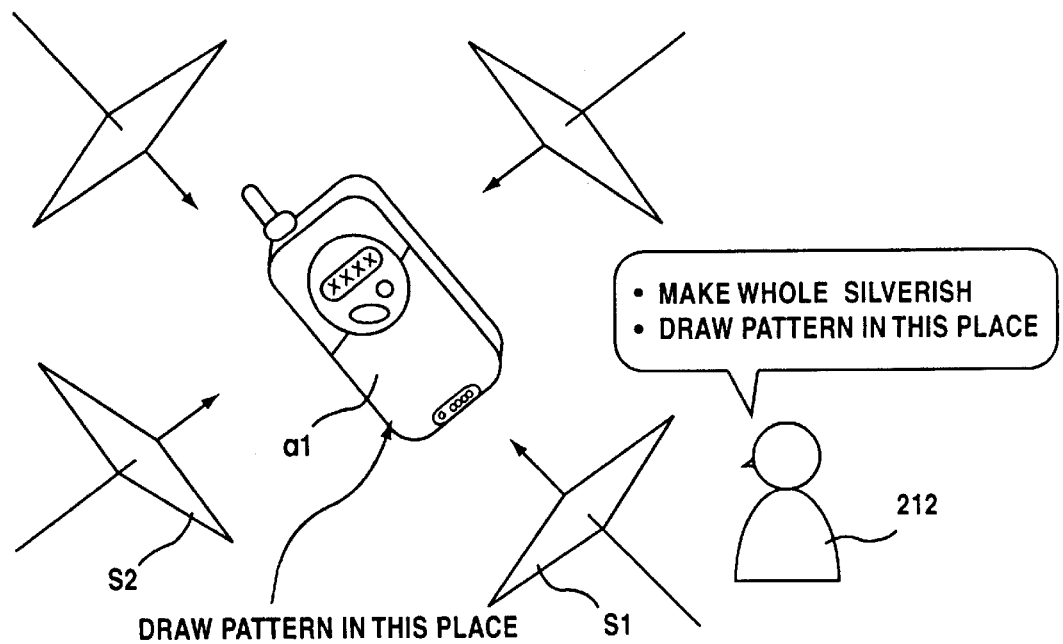
FIG. 7 is a typical view for explaining selection of six surface views of a basic model in the present invention.
Figure 8:
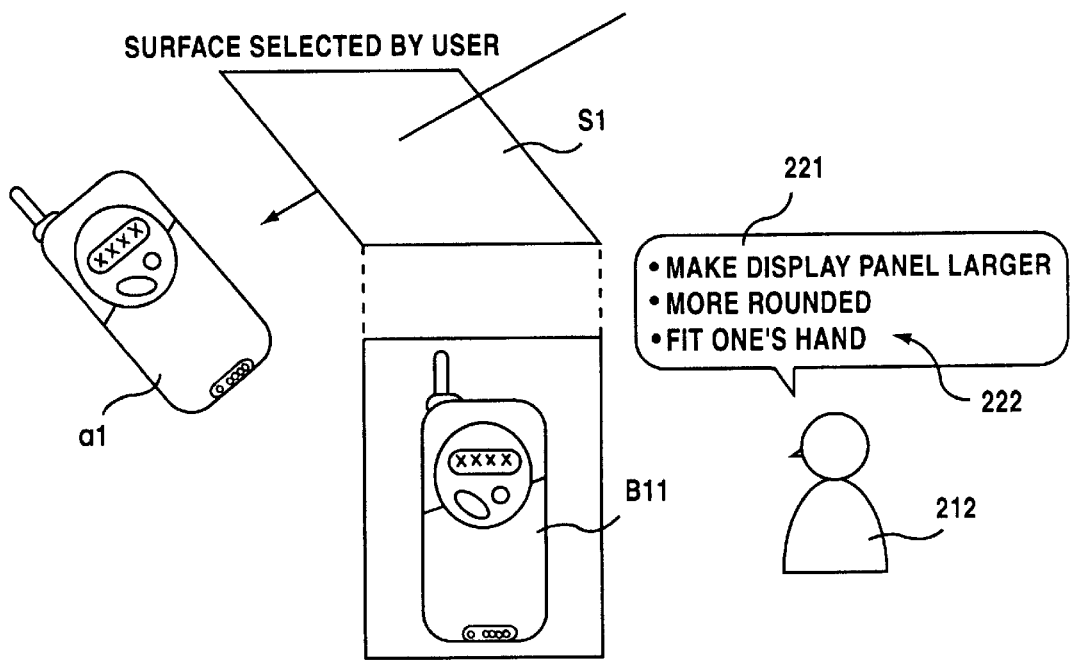
FIG. 8 is a typical view schematically showing an example of display in a case where data representing a front view of a basic model is displayed on a display screen in the present invention and input of sensible words of a user.
Figure 9:
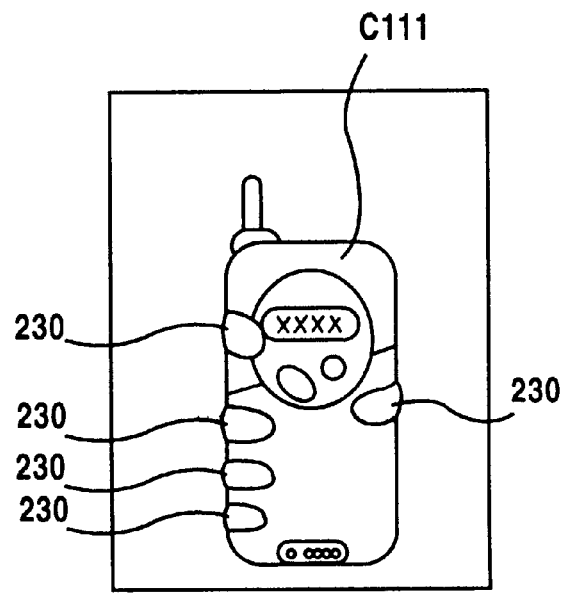
FIG. 9 is a typical view in a case where deformed data representing a front view obtained by deformation based on sensible words inputted from a user is displayed in the present invention.

The production of the appearance intended by the user 212 in the above-mentioned construction will be described. FIG. 7 is a typical view for explaining the selection of six surface views of a basic model. FIG. 8 is a typical view schematically showing an example of display in a case where basic model data representing a front view B11 is displayed on the display screen and input of a sensible word by the user 212. FIG. 9 is a front view in a case where deformed data representing a front view C111 obtained upon deformation based on a sensible word inputted from the user 212 is displayed.

Before sensibility representing the user's intention is inputted, the appearances of a plurality of basic models corresponding to basic model data stored in the basic model database 210 are grasped by the user 212, and the basic model preferred by the user 212 is selected. The user 212 may select a basic model by seeing and touching a sample of an actual equipment, may see and select a basic model displayed in a three-dimensional manner on a catalog or the like, or may see and select a basic model expressed in a three-dimensional manner on the display screen of the displaying section 219. The user 212 inputs the selected basic model to the user interface section 211 using the inputting means, and the user interface section 211 outputs to the taking-out section 216 a basic model selection signal representing basic model data corresponding to the basic model, for example, basic model data A1.

The user 212 selects the basic model and inputs a plane S1 representing the selection of a front view out of six surface views of a basic model a1 corresponding to the basic model data A1 to the user interface section 211 using the inputting means, as shown in FIG. 7. The user interface section 211 takes out a six surface view selection signal for designating the data representing a front view B11 corresponding to the front view selected by the user 212, and outputs the six surface view selection signal to the taking-out section 216.

The taking-out section 216 takes out the basic model data A1 from the basic model database 210 on the basis of the fed basic model selection signal, and outputs the basic model data A1 to the CAD system 217. Further, the taking-out section 216 takes out the data representing a front view B11 from the basic model database 210 on the basis of the fed six surface view selection signal, and outputs the data representing a front view B11 to the graphics processing section 218. The graphics processing section 218 subjects the fed data representing a front view B11 to data processing, and outputs data obtained by the data processing to the displaying section 219. The displaying section 219 displays the data representing a front view B11 on the display screen, as shown in FIG. 8.

The user 212 visually recognizes the data representing a front view B11, and inputs a sensible word 221 intended by the user 212 to the user interface section 111 using the above-mentioned inputting means. That is, sensibility representing the user's intention corresponding to the two-dimensional data representing a front view B11 is inputted to the user interface section 211. For example, when a sensible word 222 "fit one's hands" out of sensible words 221 shown in FIG. 8 is inputted, the sensible word 222 is outputted to the taking-out section 216. The taking-out section 216 takes out the deformed data representing a front view C111 from the basic model database 210 and takes out a predetermined physical parameter from the general sensibility database 209 on the basis of the inputted sensible word 222 "fit one's hands", to output the deformed data representing a front view C111 and the physical parameter to the graphics processing section 218. The graphics processing section 218 subjects the deformed data representing a front view C111 and the physical parameter to data processing, so that data obtained by the data processing are displayed on the displaying section 219. For example, the deformed data representing a front view C111 in which recesses 230 are formed is displayed, as shown in FIG. 9. In the user interface section 211, when the position on the data representing a front view B11 displayed on the displaying section 219 is inputted, and a sensible word is further inputted, the data representing a front view B11 may be partially patterned, for example, on the basis of the sensible word after performing the same processing as the foregoing, as shown in FIG. 7.

Figure 10:
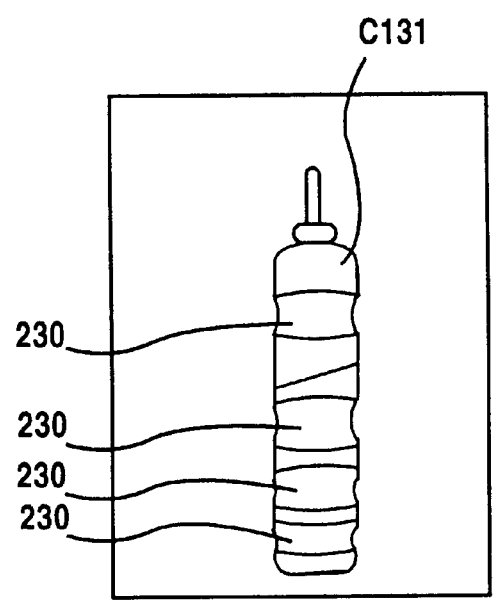
FIG. 10 is a typical view in a case where deformed data representing a side view of a basic model obtained by deformation based on sensible words inputted from a user is displayed in the present invention.

Furthermore, the user 212 can also visually recognize the data representing a front view B11 and input the sensible word 221, and then visually recognize the other one of the data representing six surface views and further input a sensible word. For example, when the user 212 inputs a plane S2 representing the selection of a side view of the basic model a1 shown in FIG. 7 to the user interface section 211 using the inputting means, the user interface section 211 outputs to the taking-out section 216 a six surface view selection signal for designating data representing a side view B13. In the taking-out section 216, deformed data representing a side view is accepted from the basic model database 210 on the basis of the sensible word 221 inputted the last time and the fed six surface view selection signal, and is outputted to the graphics processing section 218. Deformed data representing a side view C131 in which recesses 230 are formed as shown in FIG. 10 is displayed on the displaying section 219. The user 212 can further input sensible words, for example, "increase the depth of the recesses 230" and "make the whole silverish" by visually recognizing the deformed data representing a side view C131.

The taking-out section 216 takes out a physical parameter from the sensibility database 209 on the basis of the sensible word inputted by the user 212 as described above, and the physical parameter is also outputted to the CAD system 217. Consequently, the CAD system 217 designs the appearance of a three-dimensional equipment intended by the user 212 by the fed basic model data A1 and the physical parameter. The physical parameter may be outputted to the CAD system 217 every time the sensible word is inputted, or may be collectively outputted to the CAD system 217 after the input of the sensible word by the user 212 is terminated.

As described in the foregoing, the user 212 not reflects his or her intention while viewing an image of an equipment displayed in a three-dimensional manner (i.e., being conscious of a solid) but indicates the intention with respect to a two-dimensional view. Consequently, the user 212 expresses the intention more easily, and can extract the intention more easily. Further, the sensible word is inputted with respect to two-dimensional data such as a front view of a basic model, and the two-dimensional data is subjected to data processing and is indicated to the user 212, whereby time required to perform data processing for display can be reduced.

(Fourth Embodiment)

Figure 11:
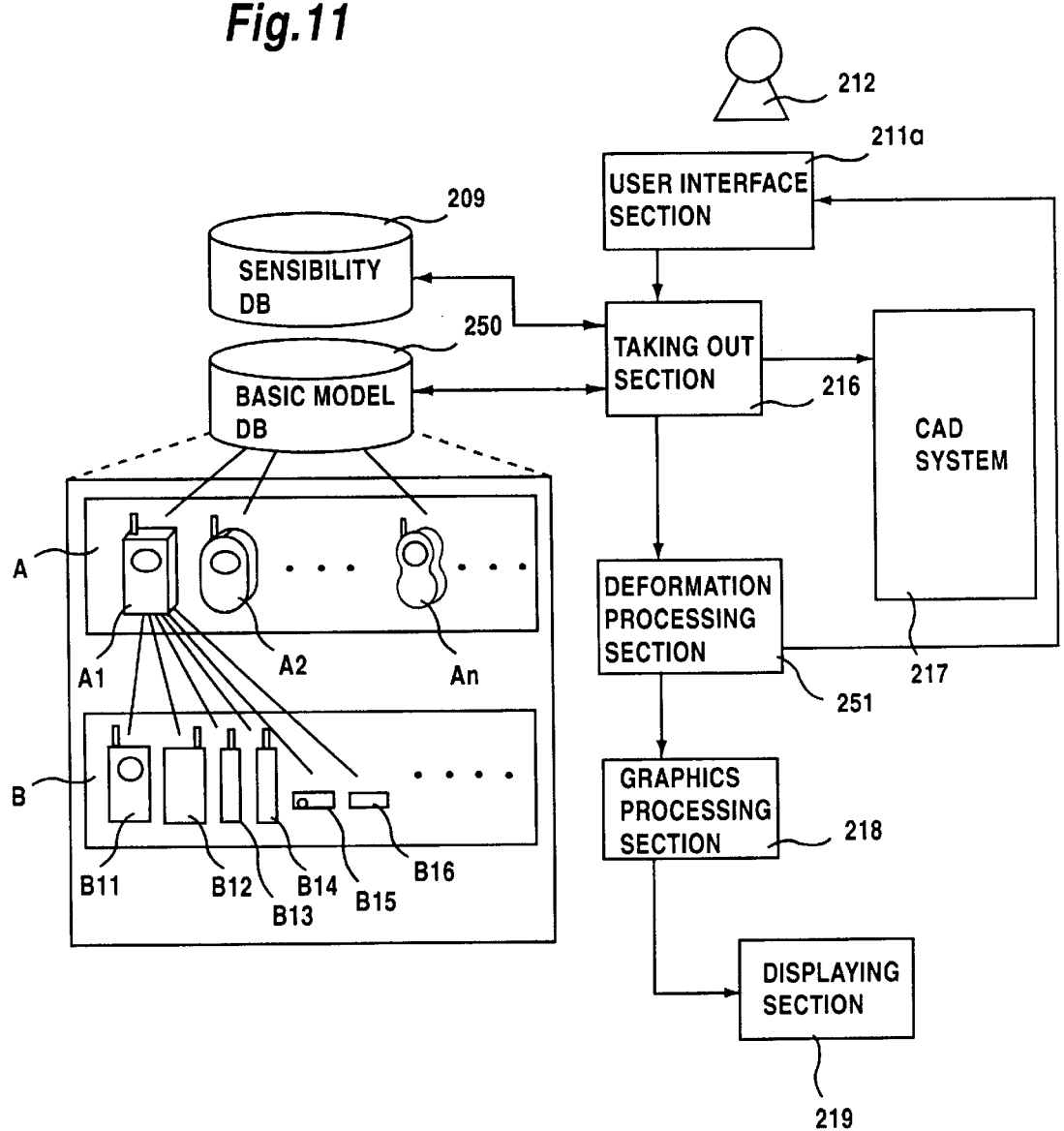
FIG. 11 is an image view showing the schematic internal construction of a personal design system according to a fourth embodiment of the present invention.

FIG. 11 is an image view showing the schematic internal construction of a personal design system according to a fourth embodiment of the present invention. The same constituent elements as those in the personal design system according to the third embodiment are assigned the same reference numerals, and the description thereof is not repeated. A basic model database 250 is so constructed as not to have the group of deformed data representing six surface views C in the basic model database 210 in the personal design system according to the third embodiment and hence, the description thereof is omitted.

Data representing six surface views and a physical parameter taken out by a sensible word are given from a taking-out section 216 to a deformation processing section 251. The deformation processing section 251 directly changes the data representing six surface views on the basis of the physical parameter. Specifically, when data representing a front data B11 is inputted as shown in FIG. 8, and a sensible word 222 "fit one's hands" is further inputted, the data representing a front view B11 is directly changed into deformed data representing a front view C111 in which recesses 230 are formed as shown in FIG. 9. The deformation processing section 251 changes the data representing a front view B11 to the deformed data representing a front view C111 as described above, and similarly makes changes with respect to the other six surface views.

Furthermore, the deformation processing section 251 comprises a judging section (not shown). The judging section judges, when each of the six surface views is changed in accordance with the physical parameter as described above, whether or not the appearance of an equipment can be suitably designed in a three-dimensional manner from deformed data representing six surface views with respect to the surface. That is, the judging section judges whether or not the data representing a front view B11 can be changed to the deformed data representing a front view C111, and deformed data representing a side view C131 or the like obtained by the change can be actually changed into three-dimensional data. When the deformation processing section 251 outputs, when the judging section judges that the appearance of an equipment can be deformed on a plane but cannot be accurately designed in a three-dimensional manner, a signal indicating that design is impossible to a user interface section 211a.

The user interface section 211a comprises reporting means for reporting to a user 212 that the appearance of an equipment cannot be designed in a three-dimensional manner by a sensible word inputted by the user 212. The user interface section 211a reports to the user 212 that the appearance of an equipment cannot be designed in a three-dimensional manner using the reporting means when the above-mentioned signal is inputted. In this case, it may be reported by being displayed on a display screen of a displaying section 219 or may be reported by voice.

The user interface section 211a may be so constructed as to comprise personal information accepting means such as a camera. The user interface section 211a may accept personal information such as the appearance of the user 212 using the personal information accepting means, and the deformation processing section 251 may produce the deformed data representing a front view C111 so as to reflect the accepted personal information. In this case, the size of the fingers, for example, is accepted, and the deformed data representing a front view C111 in which the depth and the size of recesses 230 are determined is produced on the basis of the size of the fingers.

(Fifth Embodiment)

Figure 12:
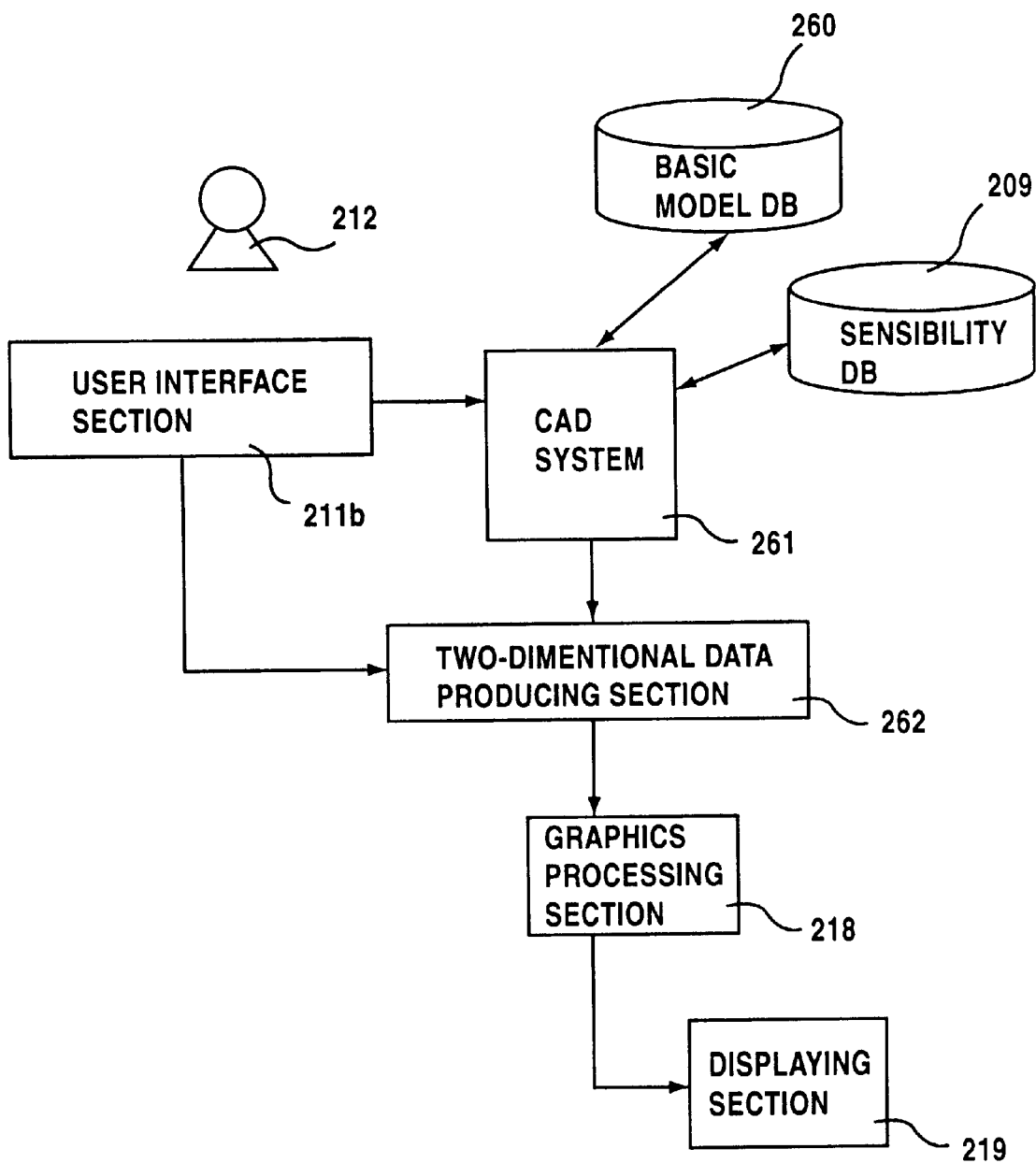
FIG. 12 is an image view showing the schematic internal construction of a personal design system according to a fifth embodiment of the present invention.

FIG. 12 is an image view showing the schematic internal construction of a personal design system according to a fifth embodiment of the present invention. The same constituent elements as those in the personal design system according to the third embodiment are assigned the same reference numerals, and the description thereof is not repeated. A basic model database 260 is so constructed as not to have the group of data representing six surface views B in the basic model database 250 in the personal design system according to the fourth embodiment, and the description thereof is omitted.

A user interface section 211b accepts entry by a user 212 in inputting means such as a key and a mouse, and outputs a basic model selection signal for designating basic model data corresponding to the design of a basic model designated by the user 212 and a sensible word representing the user's intention to a CAD system 261, and outputs a six surface view selection signal for designating data corresponding to a view designated by the user 212 out of six surface views (a front view, a side view, a rear view, and the like) to a two-dimensional data producing section 262.

The CAD system 261 accepts a physical parameter from a general sensibility database 209 on the basis of the above-mentioned sensible word, and further accepts basic model data from the basic model database 260 on the basis of the basic model section signal. The CAD system 261 designs the appearance of an equipment in a three-dimensional manner.

The above-mentioned six surface view selection signal and data representing a three-dimensional equipment from the CAD system 261 are fed to the two-dimensional data producing section 262. The two-dimensional data producing section 262 produces data corresponding to each of the six surface views of the three-dimensional equipment on the basis of the data representing the three-dimensional equipment, and outputs data designated on the basis of the six surface view selection signal to a graphics processing section 218. Specifically, a front view, for example, out of the six surface views produced on the basis of data representing the designed appearance of the three-dimensional equipment is displayed on a displaying section 219, and the user 212 visually recognizes the front view. Consequently, the user 212 further inputs sensibility while confirming the designed appearance of the actual equipment for each surface.

FIG. 13A is a diagram showing the schematic construction of a VR system for producing virtual reality with respect to the user 212, and FIG. 13B is a schematic view for explaining a VR globe of the VR system shown in FIG. 13A. The VR system comprises a VR goggle 231 for visually producing virtual reality, a VR globe 232 for actually producing virtual reality, a detecting operation device 223 comprising a motor 223a for detecting the position of the VR globe 232 as well as driving the motor 223a to apply a force upward and downward and leftward and rightward throughout the VR globe 232 through a wire 223b, and a control device 224 for controlling each of the devices. The VR globe 232 applies pressure to the user 212 and accepts the pressure applied from the user's fingers by constructing a plurality of pressure point stimulating elements 226 and pressure sensors 227 at predetermined spacing.

The user 212 can virtually confirm the shape, the weight, the quality and the like of the designed appearance of the equipment by feeding to the VR system data representing a three-dimensional equipment produced in the third to fifth embodiments. The user 212 confirms whether or not the designed appearance of the equipment is the same as that as intended. When the designed appearance differs from that as intended, the sensible word can be inputted, for example, again using the devices shown in the third to fifth embodiments. Three-dimensional data found in the first and second embodiments may be given to the VR system.

According to the third embodiment to the fifth embodiment, the sensible word is inputted to two-dimensional data such as the data representing the front view of the basic model, the two-dimensional data is subjected to data processing, and data obtained by the data processing is indicated to the user, time required for the data processing may be small, whereby it is possible to quickly present to the user a corrected appearance reflecting the user's intention.

(Sixth Embodiment)

Figure 14:
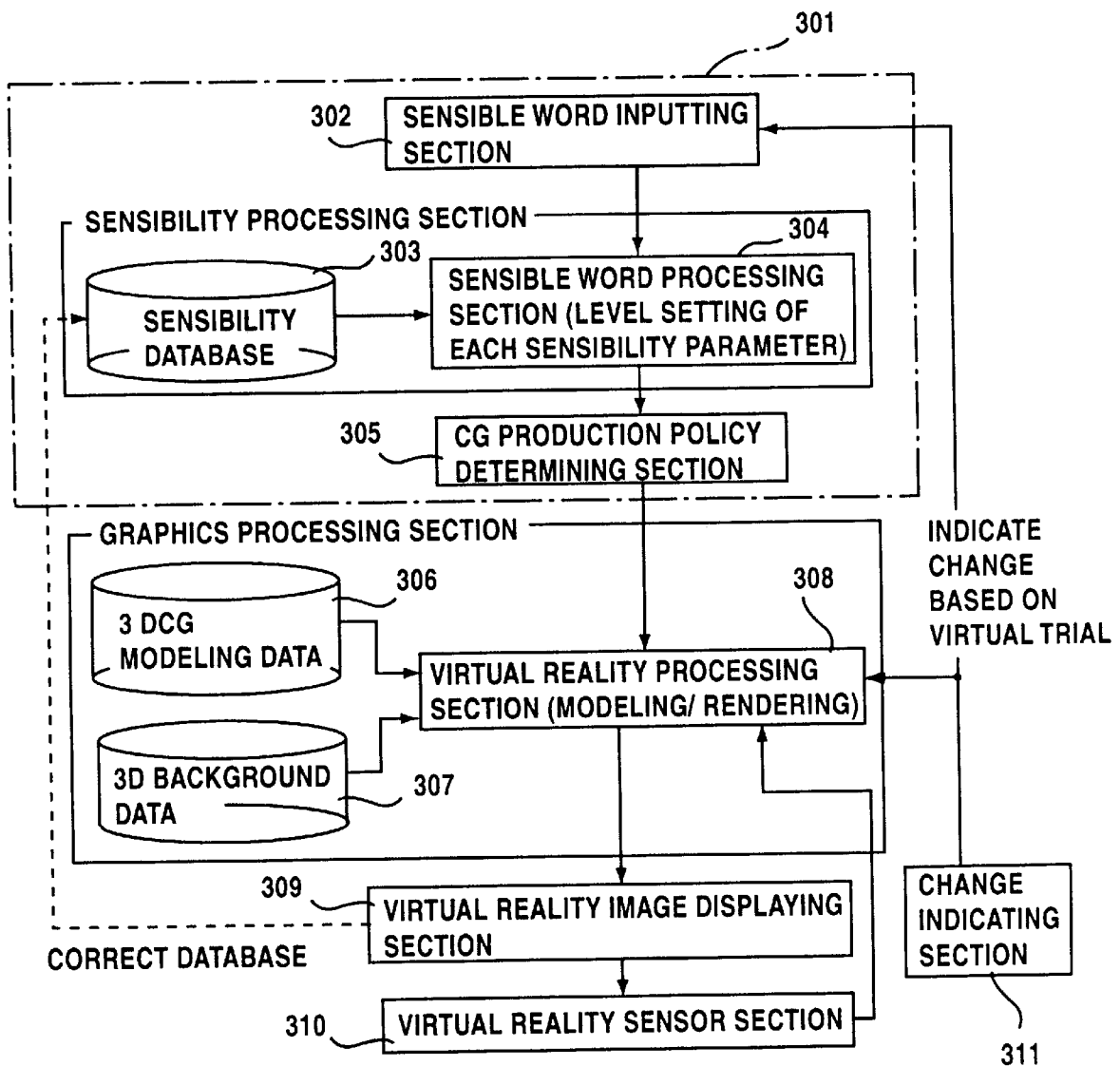
FIG. 14 is a block diagram showing the schematic internal construction of a personal design system according to a sixth embodiment of the present invention.

FIG. 14 is a block diagram showing the schematic construction of a personal design system according to a sixth embodiment.

A designing section 301 comprises a sensible word inputting section 302, a general sensibility database 303, a sensible word processing section 304, a CG (Computer Graphic) production policy determining section 305.

The sensible word inputting section 302 is so constructed as to display on a display screen (see FIG. 15) an image expressing words representing a user's intention (hereinafter referred to as sensible words), for example, antonyms "quiet" and "loud" or "old" and "new" alternatively or in SD (Semantic Differential) measures in five stages including a factor intermediate therebetween, and cause the user to select the image by a pointing device, for example, or the user's hands virtually displayed.

The sensibility database 303 holds design parameters corresponding to the sensible words. For example, there shall be "shape", "pattern" and "color" as design factors. With respect to the lightness of the "color", for example, it is considered that design parameters corresponding to the sensible words "quiet" and "loud" and indicating using numerical values which degree of lightness is employed in "dark color" and "bright color" are held. With respect to the "shape", for example, it is considered that design parameters corresponding to the sensible words "old" and "new" and indicating using numerical values which degree of roundness is employed in "square shape" and "rounded shape" are held. This is, of course, one example. The present invention is not limited to the same.

The sensible word processing section 304 sets the level of each of the sensible words. That is, the design parameters of each of the design factors are extracted from the sensibility database 303 on the basis of the inputted sensible words.

The CG production policy determining section 305 infers the design of the appearance of an equipment on the basis of the extracted design parameters. For example, when "quiet" is selected as a sensible word, the degree to which a dark color is used is high, whereby it is inferred that the color of the surface of a casing of the equipment is, for example, is a blackish color.

A three-dimensional modeling database 306 has as data a shape model of an equipment (a geometrical shape), a surface model (the color and the quality of a surface), a light source model (the size and the quality of a light source), a motion model (the change in the form of the equipment), and a visual field model (the position of a viewing point, the direction of the line of sight, and the angle of visibility).

A three-dimensional background database 307 has as data a shape model, a surface model, and the like with respect to a background, similarly to the above-mentioned database 306. As the background, background display data corresponding to environments such as the interior and the exterior of a house, a living room, a bedroom and a kitchen even in the same house, and the morning and the night even in the same living room are stored.

A virtual reality processing section (modeling/rendering) 308 acquires predetermined model data from the three-dimensional modeling database 306 on the basis of inference information from the CG production policy determining section 305. When sensible words "old" and "quiet" are inputted, for example, a square model is employed as the shape model, and a blackish model is employed as the surface model. An equipment composed of the models is arranged in a space in the form of data, the data is converted in correspondence to the position of the viewing point of the user, processing for plane projection (modeling) is performed, and processing such as hidden-surface removal, shading and mapping (rendering) is performed. In the case of such processing, arbitrary background data is acquired from the three-dimensional background database 307, the direction, the brightness and the like of interior lighting in the background data are reflected on display of an image representing the equipment, a background image represented by the background data is produced, and image data obtained by synthesizing the background image and the image representing the equipment is produced. The movement of the user's hands is detected in a virtual reality sensor section 310 as described later, and such data processing that the user's hands are also virtually image-displayed is performed.

The above-mentioned image data is supplied to a virtual reality image displaying section 309. The virtual reality image displaying section 309 is a head mounting type image display device which is mounted on the head of the user, for example, and is constituted by the VR goggle 231 and the like shown in FIG. 13. The equipment having the designed appearance, together with the background arbitrarily selected, is image-displayed on a display screen of the image display device, and the user has a VR experience of the use of the equipment having the designed appearance under a certain environment.

Figure 13:
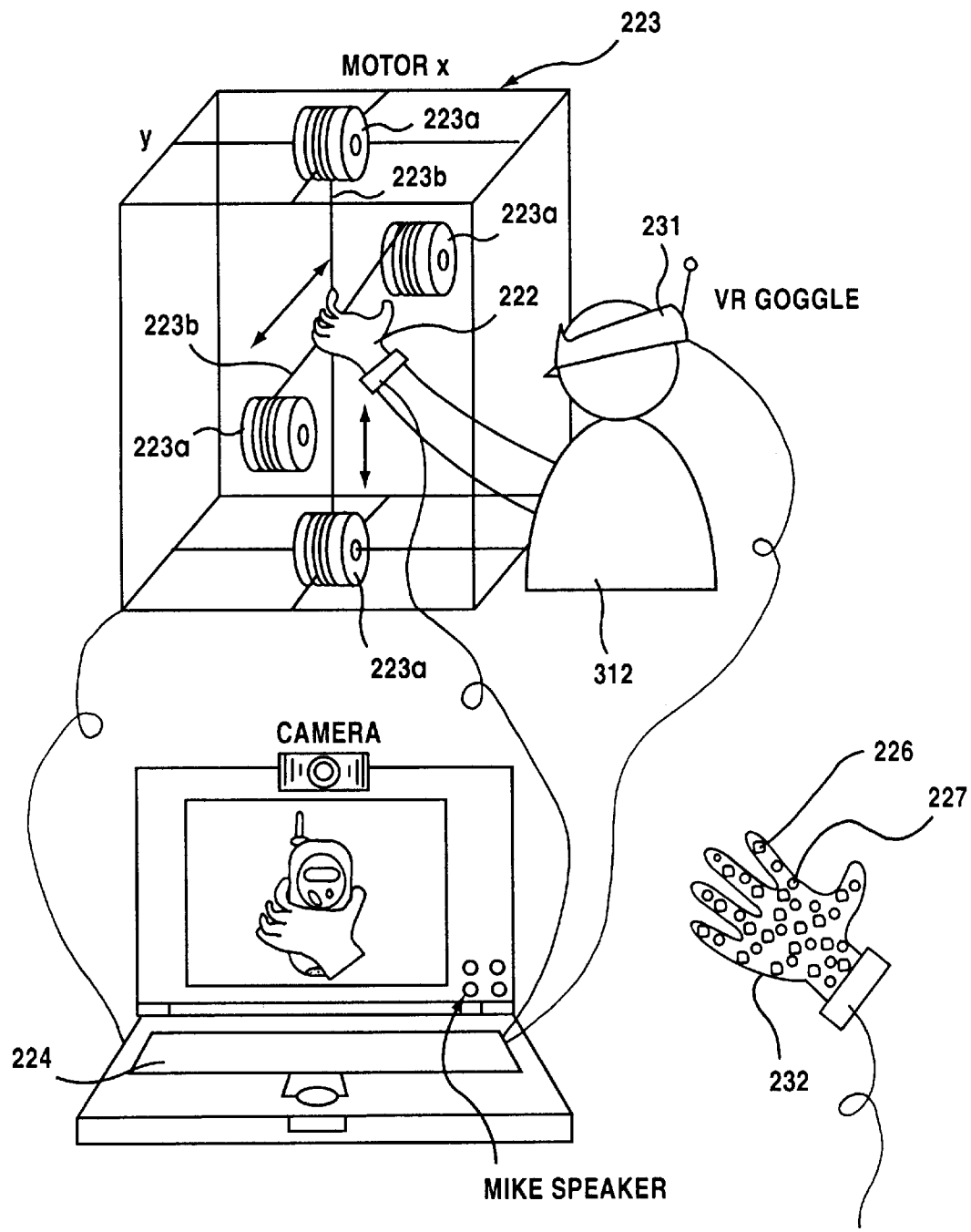
FIG. 13A is a diagram showing the schematic construction of a VR system for producing virtual reality with respect to a user in the present invention.
FIG. 13B is a schematic view for explaining a VR globe of the VR system in the present invention shown in FIG. 13A.

The virtual reality sensor section 310 is constituted by a plurality of sensors mounted on the VR globe 232 shown in FIG. 13, for example, the movement of the user's hands is judged, and information representing the judgment is given to the virtual reality processing section 308. The above-mentioned globe 232 may be provided with the pressure point stimulating element 226 and the like for bodily sensing, when the user's hands virtually touch the equipment virtually displayed, the touch.

A change indicating section 311 is operated when the user desires an appearance different from the designed appearance of the equipment which the user has a VR experience and desires a different background. When the user desires the different appearance, sensible words conforming to the designed appearance are given. When the user desires the different background, the background is designated. When the background is designated by the user, information for designating background is fed to the virtual reality processing section 308. The virtual reality processing section 308 which received the information for designating background performs required processing upon acquisition of background data corresponding to the information from the three-dimensional background database 307. The change of the background may be indicated through the sensible word inputting section 301. That is, words representing the state of "kitchen", "living room" or the like are displayed on the display screen, and sensible words "urban" and "dull" are displayed thereon, as in the above-mentioned SD display. It is also possible to indicate "background of an urban living room", for example, in the selection.

According to the above-mentioned construction, when it is desired to obtain a cassette tape recorder having an appearance desired by a user 312 as shown in FIG. 15, it is possible to produce the appearance by sensible words, and it is possible to evaluate the convenience of use of the cassette tape recorder having the desired appearance, for example, the ease of a button operation, the good visuality of a level meter, and the matching of the interior of a room and the cassette tape recorder. When an evaluation "desire to make the whole more compact", "desire to make a recording button noticeable", or "desire to make operation easy even in dark lighting" is made, changes in design such as miniaturization, changes in arrangement, and roundness are made in correspondence to the "compact", changes in design such as red color and large size are made in correspondence to the "noticeable recording button", and changes in design such as multicoloring and high luminance of a liquid crystal light emitting diode (LED) are made in correspondence to "easy operation even in darkness".

The following Table 1 indicates one example of items of sensibility evaluation for virtual trial.

TABLE 1

| | |
|---|---|
| Whole | * overall impressions of the equipment having the designed appearance in an inherent use environment (evaluation of the size, the color, the shape, etc. on a spurious background) |
| Operability | * whether or not the equipment is in the mode of operations for preventing erroneous operations (the size, the shape, the classification by color, etc. of a switch)<br>* whether or not designed operations are performed by a driving section (opening or closing of a door) and a display panel<br>* whether or not the equipment is easy to use<br>* whether or not the equipment does not have an unnecessary function<br>* whether or not the equipment has a necessary function |
| Effect of Lighting | * ease of seeing an operation panel and a switch by light and brightness of lightning<br>* evaluation of the color of the appearance of the equipment depending on the difference in lighting |

As previously described, the personal design system according to the sixth embodiment accepts input of a sensible word representing the user's intention in a state where an image is recognized, and changes three-dimensional equipment display data on the basis of the inputted sensible word representing the intention. However, it may change design parameters corresponding to the sensible word in the database 306 in correspondence to the change of the three-dimensional equipment display data, or separately have data to be changed. That is, there are cases such as a case where the general sensibility database 303 is based on the sensibility of a standard person statistically processed and a case where the sensibility, the physical features and the like of the user 312 himself or herself differ from those of the standard person, a difference may, in some cases, arise between the sensibility of the user 312 and the parameters in the sensibility database 303. In such a case, the appearance of the equipment accurately reflecting the user's intention (the sensibility of the user) is designed by changing the design parameters corresponding to the sensible word in correspondence to the change of the three-dimensional equipment display data. Although in the sixth embodiment, a three-dimensional image is recognized by virtual reality. The present invention is not limited to the same. The three-dimensional image may be displayed on a CRT.

As described in the foregoing, according to the sixth embodiment, such an effect that the convenience of use of the equipment having the appearance designed under a certain environment by the recognition of the image, for example, the ease of seeing the display panel under a fluorescent lamp in a room or the matching of the interior of the room and the equipment can be evaluated is produced.

As described in the personal design system according to the first embodiment, the personal design system according to the third to sixth embodiments may be constructed in a server and a user terminal. In this case, the load on the user terminal may be reduced by storing a database and the like in the server, for example, and sending and receiving data in communication.

Although the present invention has been described and illustrated in detail, it is clearly understood that the same is by way of illustration and example only and is not to be taken by way of limitation, the spirit and scope of the present invention being restricted only by the terms of the appended claims.

What is claimed is:

1. A personal design system comprising:
a server storing a sensibility database of a standard person statistically processed;
a user terminal network-connected to the server;
a user information inputting section provided in the user terminal for inputting user information such as sensibility from a user;
a displaying section provided in the user terminal for displaying an image;
designing means for designing the appearance of an equipment suiting the taste of the user on the basis of said user information sent from said user information inputting section; and
graphics processing means for producing image display data representing the designed appearance of said equipment and outputting the image display data to said displaying section.

2. The personal design system according to claim 1, wherein
said user information includes sensibility data of the user and personal information data such as the physical features of the user.

3. The personal design system according to claim 1, wherein
said designing means comprises a sensibility classification and quantification processing section connected to said user information inputting section for classifying and quantifying said user information, and a personal information database storing said user information of the user obtained by the classification and quantification in the sensibility classification and quantification processing section.

4. The personal design system according to claim 3, wherein
said server comprises a product shape production database storing the design of a basic model and a knowledge base storing production knowledge for producing the basic model, and
said designing means comprises an analysis and inference engine for producing design production data corresponding to the sensibility of the user on the basis of said sensibility database, said product shape production database, said knowledge base, and said personal information database.

5. The personal design system according to claim 4, wherein
said designing means further comprises a CAD interface for converting said design production data to produce CAD data, and a CAD tool for producing sensibility CAD data based on said user information from said CAD data,
said CAD interface and said CAD tool being provided in said server, said produced sensibility CAD data being transmitted to the user terminal from said server.

6. The personal design system according to claim 4, wherein
said designing means comprises a CAD interface for converting said design production data to produce CAD data, and a CAD tool for producing sensibility CAD data based on said user information from said CAD data,
said CAD interface and said CAD tool being provided in the user terminal.

7. A personal equipment production system comprising:
a server storing a sensibility database of a standard person statistically processed;
a user terminal network-connected to the server;
a user information inputting section provided in the user terminal for inputting user information such as sensibility from a user;

a displaying section provided in the user terminal for displaying an image;

designing means for designing the appearance of an equipment suiting the taste of said user on the basis of said user information sent from said user information inputting section;

graphics processing means for producing image display data representing the designed appearance of said equipment and outputting the image display data to said displaying section;

a design and production database provided in said sever and composed of design and production data required to design the appearance of the equipment and produce the equipment having the designed appearance; and producing means provided in said server for accepting the designed appearance of the equipment from said designing means and accepting said design and production data from said design and production database to produce the equipment having the designed appearance.

8. The personal equipment production system according to claim 7, wherein said user information includes sensibility data of the user and personal information data such as the physical features of the user.

9. The personal equipment production system according to claim 7, wherein said producing means comprises a judging section for judging whether or not the equipment having the designed appearance sent from said designing means can be actually produced.

10. A personal equipment production system comprising:

a server storing a sensibility database of a standard person statistically processed;

a user terminal network-connected to the server; a user information inputting section provided in the user terminal for inputting user information such as sensibility from a user;

a displaying section provided in the user terminal for displaying an image;

designing means for designing the appearance of an equipment suiting the taste of said user on the basis of said user information sent from said user information inputting section;

graphics processing means for producing image display data representing the designed appearance of said equipment and outputting the image display data to said displaying section;

a design and production database provided in said server and composed of design and production data required to design the appearance of the equipment and produce the equipment having the designed appearance; and producing means provided in said server for accepting the designed appearance of the equipment from said designing means and accepting said design and production data from said design and production database to produce the equipment having the designed appearance;

wherein said producing means comprises a part producing section for producing parts of said equipment on the basis of the designed appearance of the equipment, a coloring and patterning section for coloring and patterning the parts produced in said part producing section on the basis of the designed appearance of the equipment, and a part assembling section for assembling the parts colored and patterned in said coloring and patterning section into the equipment on the basis of said design and production data.

11. The personal equipment production system according to claim 10, wherein said user information includes sensibility data of the user and personal information data such as the physical features of the user.

12. A personal design system so adapted as to design the appearance of an equipment in a three-dimensional manner on the basis of a word representing intention, comprising means for displaying a two-dimensional view relating to said equipment projected on a predetermined surface on an image displaying section and displaying a corrected two-dimensional view obtained by the correction based on the word representing intention on said image displaying section when the word is inputted.

13. The personal design system according to claim 12, further comprising a database previously storing data representing the two-dimensional view relating to said equipment projected on said predetermined surface.

14. The personal design system according to claim 12, wherein the data representing the two-dimensional view relating to said equipment projected on said predetermined surface is produced on the basis of three-dimensional data of the equipment.

15. The personal design system according to claim 12, further comprising a database previously storing data representing said corrected two-dimensional view.

16. The personal design system according to claim 12, further comprising correcting means for correcting the data representing said two-dimensional view on the basis of said word to produce the data representing said corrected two-dimensional view.

17. The personal design system according to claim 12, further comprising judging means for judging whether or not the appearance of the equipment can be suitably designed in a three-dimensional manner from the data representing the corrected two-dimensional view with respect to each surface.

18. A personal design system comprising:

a database holding a design parameter corresponding to a word representing intention;

an equipment appearance designing section for designing the appearance of an equipment on the basis of said word representing intention;

means for producing three-dimensional equipment display data of the equipment having the appearance designed in said appearance designing section on the basis of design data of the equipment;

means for producing three-dimensional background display data corresponding to a use environment of the equipment; and means for synthesizing said three-dimensional equipment display data and said three-dimensional background display data and making a person image-recognize data obtained by the synthesis.

19. The personal design system according to claim 18, wherein said means for making the person image-recognize the data obtained by the synthesis is a virtual reality device.

20. The personal design system according to claim 18, further comprising means for changing said three-dimensional background display data in response to a person's request.

21. The personal design system according to claim 18, further comprising means for accepting input of the word representing intention in a state where the person is made to image-recognize the data obtained by the synthesis, changing the designed appearance of the equipment on the basis of the inputted word representing intention, and changing the three-dimensional equipment display data with the change of the designed appearance.

* * * * *